(12) United States Patent
Ataras

(10) Patent No.: US 11,630,775 B2
(45) Date of Patent: Apr. 18, 2023

(54) PROVIDING ROLLING UPDATES OF DISTRIBUTED SYSTEMS WITH A SHARED CACHE

(71) Applicant: ROKU, INC., Los Gatos, CA (US)

(72) Inventor: Bill Ataras, Portland, OR (US)

(73) Assignee: Roku, Inc., San Jose, CA (US)

( * ) Notice: Subject to any disclaimer, the term of this patent is extended or adjusted under 35 U.S.C. 154(b) by 203 days.

(21) Appl. No.: 16/281,885

(22) Filed: Feb. 21, 2019

(65) Prior Publication Data
US 2019/0188135 A1 Jun. 20, 2019

Related U.S. Application Data

(63) Continuation of application No. 14/984,292, filed on Dec. 30, 2015, now Pat. No. 10,229,058.

(51) Int. Cl.
*G06F 16/957* (2019.01)
*G06F 12/084* (2016.01)
(Continued)

(52) U.S. Cl.
CPC .............. *G06F 12/084* (2013.01); *G06F 8/65* (2013.01); *G06F 8/656* (2018.02); *G06F 12/0873* (2013.01); *G06F 16/9574* (2019.01); *G06F 2212/1008* (2013.01); *G06F 2212/1048* (2013.01); *G06F 2212/163* (2013.01); *G06F 2212/282* (2013.01); *G06F 2212/313* (2013.01);
(Continued)

(58) Field of Classification Search
CPC .............. G06F 12/084; G06F 16/9574; G06F 12/0873; G06F 8/65; G06F 8/656; G06F 2212/1008; G06F 2212/1048; G06F 2212/282; G06F 2212/313; G06F 2212/314; G06F 2212/163; G06F 2212/62; G06F 16/172
See application file for complete search history.

(56) References Cited

U.S. PATENT DOCUMENTS 6,216,212 B1 4/2001 Challenger et al.
6,510,552 B1 1/2003 Benayoun et al.
(Continued)

OTHER PUBLICATIONS

International Search Report and Written Opinion of the International Searching Authority for International Application No. PCT/US2016/065625, dated Feb. 21, 2017 (16 pages).
(Continued)

*Primary Examiner* — Charles D Adams
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for providing rolling updates of distributed systems with a shared cache. An embodiment operates by receiving a platform update request to update data item information associated with a first version of a data item cached in a shared cache memory. The embodiment may further operate by transmitting a cache update request to update the data item information of the first version of the data item cached in the shared cache memory, and isolating the first version of the data item cached in the shared cache memory based on a collection of version specific identifiers and a version agnostic identifier associated with the data item.

22 Claims, 15 Drawing Sheets

(51) Int. Cl.
    *G06F 12/0873*     (2016.01)
    *G06F 8/65*     (2018.01)
    *G06F 8/656*     (2018.01)

(52) U.S. Cl.
    CPC .... *G06F 2212/314* (2013.01); *G06F 2212/62* (2013.01)

(56) References Cited

U.S. PATENT DOCUMENTS

| | | | |
|---|---|---|---|
| 6,785,769 B1 * | 8/2004 | Jacobs | H04L 67/2819 |
| | | | 711/118 |
| 6,813,690 B1 | 11/2004 | Lango et al. | |
| 6,918,113 B2 | 7/2005 | Patel et al. | |
| 7,225,208 B2 | 5/2007 | Midgley | |
| 7,383,289 B2 | 6/2008 | Kraft | |
| 7,523,149 B1 | 4/2009 | Sridharan | |
| 7,644,108 B1 | 1/2010 | Malmskog | |
| 7,739,316 B2 | 6/2010 | Thompson et al. | |
| 7,792,845 B1 | 9/2010 | Binns | |
| 8,131,739 B2 | 3/2012 | Wu et al. | |
| 8,762,980 B1 * | 6/2014 | Sobel | G06F 8/65 |
| | | | 717/170 |
| 9,084,105 B2 | 7/2015 | Luna | |
| 10,229,058 B2 | 3/2019 | Ataras | |
| 2004/0255048 A1 | 12/2004 | Lev Ran et al. | |
| 2009/0271472 A1 | 10/2009 | Scheifler | |
| 2012/0173541 A1 * | 7/2012 | Venkataramani | G06F 16/2255 |
| | | | 707/747 |
| 2012/0203861 A1 * | 8/2012 | Flack | G06Q 10/10 |
| | | | 709/217 |
| 2014/0081652 A1 | 3/2014 | Klindworth | |
| 2015/0019676 A1 * | 1/2015 | Fablet | G06F 16/9574 |
| | | | 709/213 |
| 2015/0373191 A1 * | 12/2015 | Shaw | H04W 8/20 |
| | | | 455/414.1 |
| 2017/0192884 A1 | 7/2017 | Ataras | |

OTHER PUBLICATIONS

European Search Report directed to related European Application No. 16882282.3, dated Jul. 25, 2019; 10 pages.

International Preliminary Report on Patentability directed to International Application No. PCT/US2016/065625, dated Jul. 3, 2017 (11 pages).

* cited by examiner

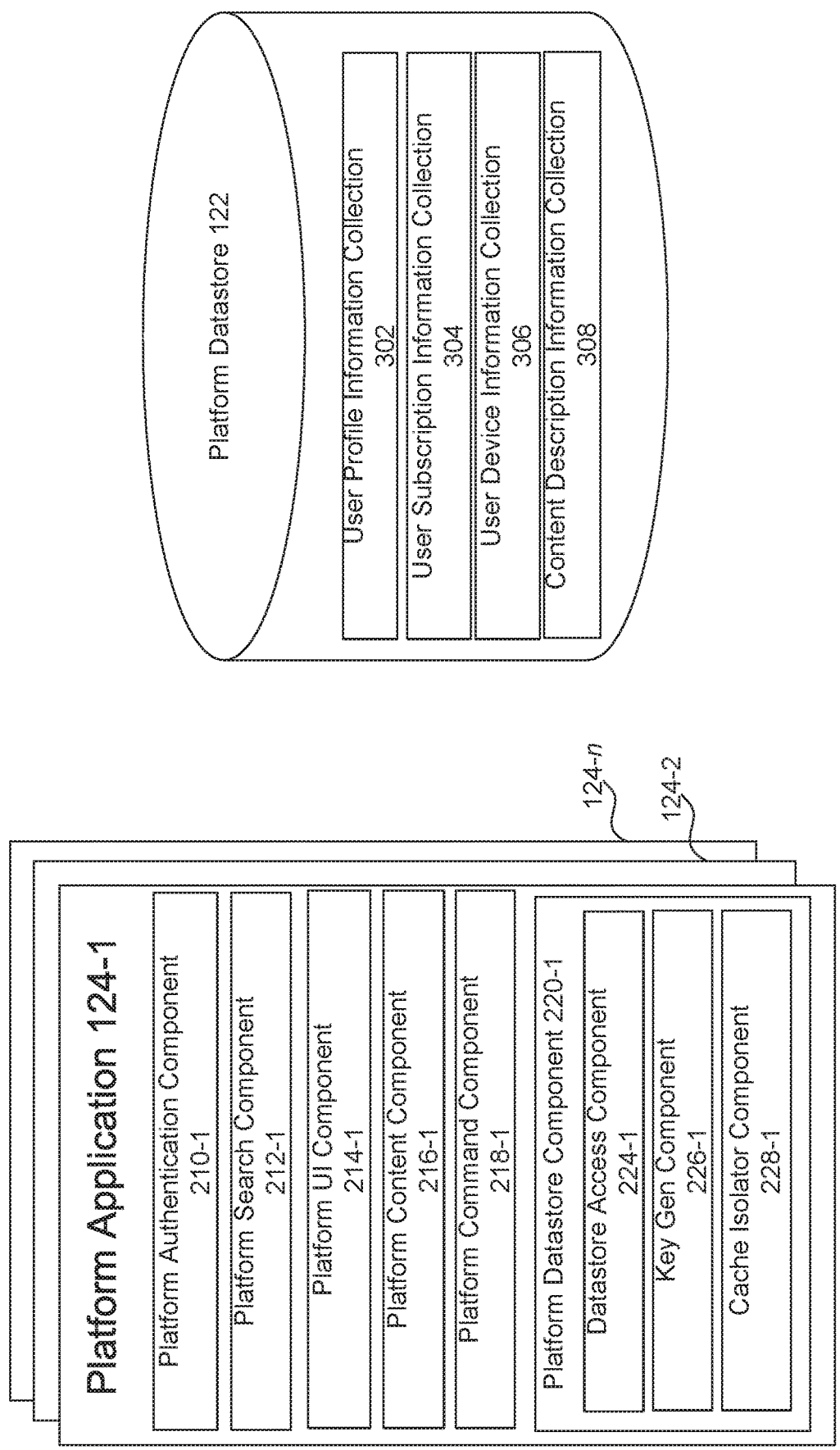

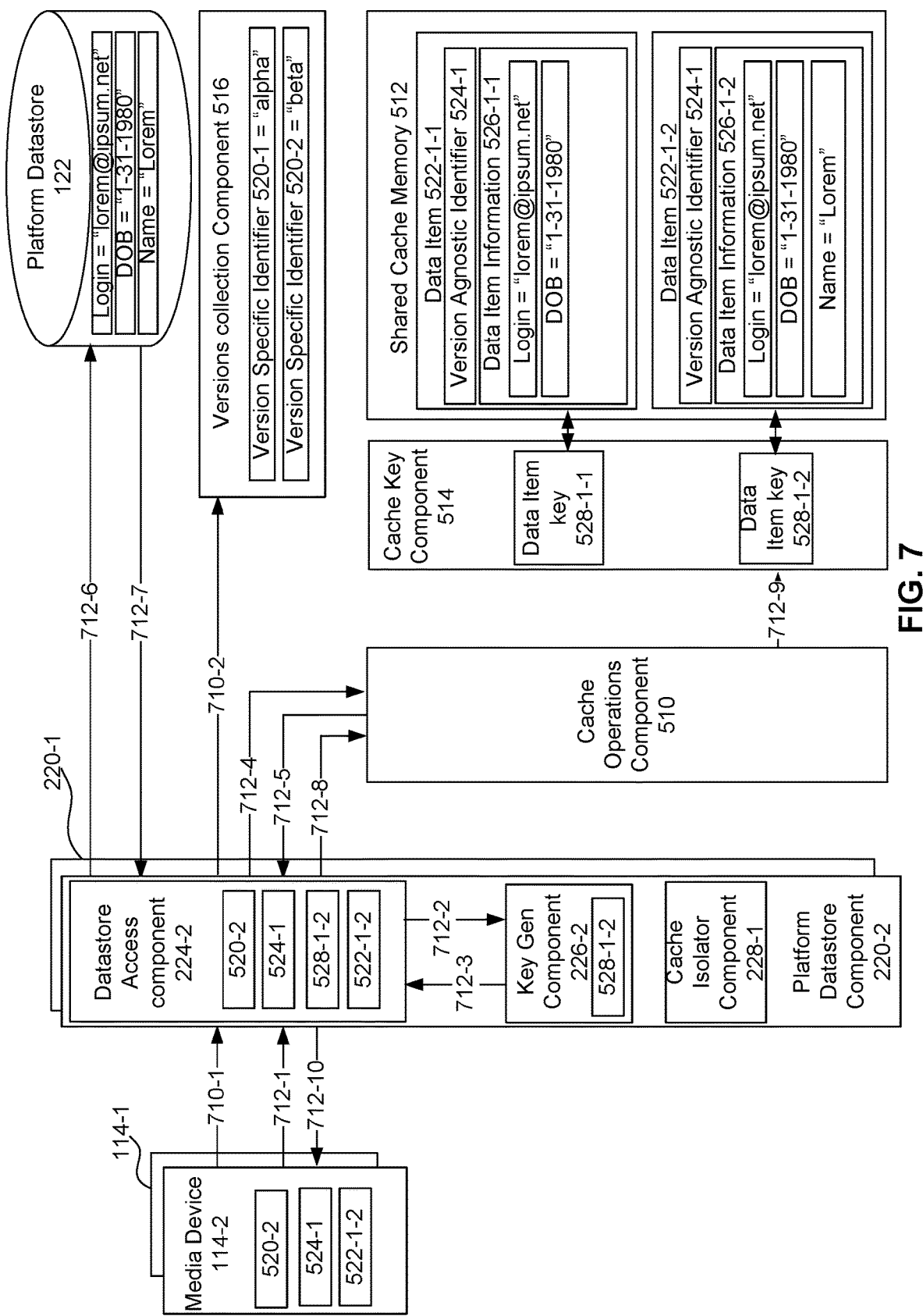

PROVIDING ROLLING UPDATES OF DISTRIBUTED SYSTEMS WITH A SHARED CACHE

CROSS REFERENCE TO RELATED APPLICATION

This application is a continuation of U.S. Non-Provisional Patent application Ser. No. 14/984,292 titled "PROVIDING ROLLING UPDATES OF DISTRIBUTED SYSTEMS WITH A SHARED CACHE" filed on Dec. 30, 2015. The above referenced application is herein incorporated by reference in its entirety.

BACKGROUND

Field

This disclosure is generally directed to rolling updates of a distributed system. More particularly, this disclosure relates to providing rolling updates of a distributed system with a shared cache.

Background

Consumer electronics such as, for example, high definition audio and/or video play back devices, may generally enable a user or consumer to watch or listen to their favorite content, such as, for example, music, movies, TV series, audio books, and/or the like by receiving or streaming the content for play back on their devices. To provide consumers with the best streaming experience, these devices and the associated supporting backend systems are typically updated on a regular basis. However, in many instances, it may not be possible to update all backend systems and/or devices at the same time. Thus, in order to provide uninterrupted service to users or consumers that may use both non-updated devices and backend systems and updated devices and backend systems, it is sometimes necessary that multiple versions of these devices and/or backend systems must operate concurrently. However, concurrent operation between various versions of these devices and/or backend systems may become especially challenging, when different versions of these devices and/or backend systems may share the same storage resource(s) and also share at least a portion of the information stored in those storage resource(s).

SUMMARY

Provided herein are system, apparatus, article of manufacture, method and/or computer program product embodiments, and/or combinations and sub-combinations thereof, for providing rolling updates of a distributed system with a shared cache.

An embodiment includes a computer implemented method for providing rolling updates of a distributed system with a shared cache. The method may operate by receiving a platform update request to update data item information associated with a first version of a data item cached in a shared cache memory. The embodiment may further operate by transmitting a cache update request to update the data item information of the first version of the data item cached in the shared cache memory, and isolating the first version of the data item cached in the shared cache memory based on a collection of version specific identifiers and a version agnostic identifier associated with the data item.

Another embodiment includes a system for providing rolling updates of a distributed system with a shared cache. The system may include at least one processor and a memory coupled to the at least one processor and configured to receive a platform update request to update data item information associated with a first version of a data item cached in a shared cache memory. The at least one processor may be further configured to transmit a cache update request to update the data item information of the first version of the data item cached in the shared cache memory, and isolate the first version of the data item cached in the shared cache memory based on a collection of version specific identifiers and a version agnostic identifier associated with the data item.

A further embodiment includes a tangible computer-readable device having instructions stored thereon that, when executed by at least one computing device, causes the at least one computing device to perform operations. The operations may include receiving a platform update request to update data item information associated with a first version of a data item cached in a shared cache memory. The operations may further include transmitting a cache update request to update the data item information of the first version of the data item cached in the shared cache memory and isolating the first version of the data item cached in the shared cache memory based on a collection of version specific identifiers and a version agnostic identifier associated with the data item.

BRIEF DESCRIPTION OF THE FIGURES

The accompanying drawings are incorporated herein and form a part of the specification.

FIG. 2 illustrates block diagrams of a platform server device(s) including platform application(s) according to an example embodiment.

FIG. 3 illustrates a block diagram of a platform datastore configured according to an example embodiment.

FIG. 7 illustrates another set of interactions for registering active versions and caching one or more data items according to an example embodiment.

Figure 1:
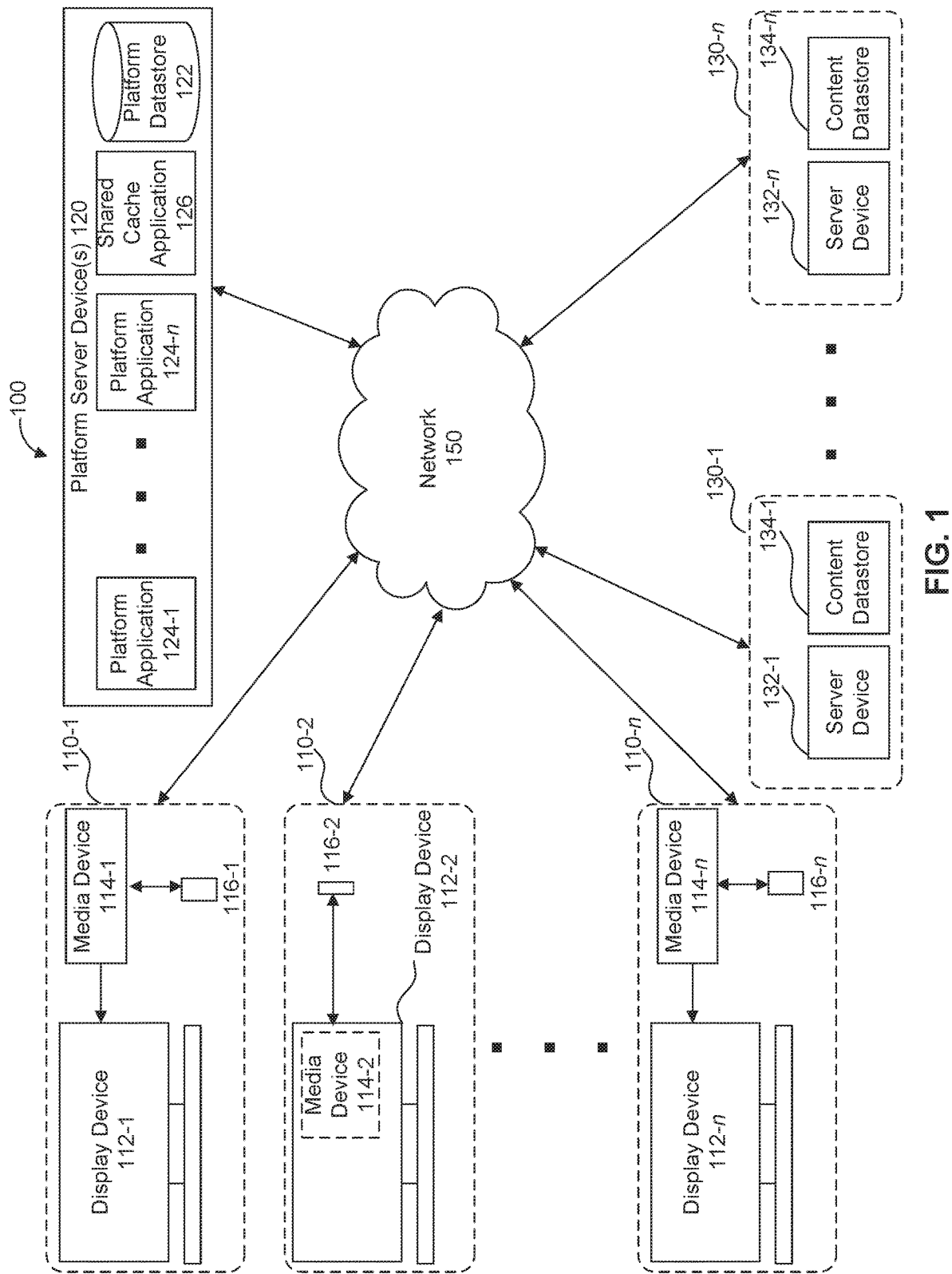
FIG. 1 illustrates a block diagram of a cache plasticity system configured according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 114-$n$ may include elements 114-1, 114-2, 114-3, and 114-4. Furthermore, unless explicitly stated otherwise, a complete set of elements may vary for a given feature, embodiment, and/or implementation even though the same designator may be used between various features, embodiments, and/or implementations.

DETAILED DESCRIPTION

FIG. 1 illustrates a block diagram of a cache plasticity system 100, according to an embodiment. In particular, the cache plasticity system 100 may include one or more interface systems 110-$n$, platform server devices 120, and one or more content source systems 130-$n$. In an embodiment, the interface systems 110-$n$ may include, without limitation, display devices 112-$n$ (e.g. a monitor, television, a projector, etc.), media devices 114-$n$ (e.g. streaming devices, multimedia devices, audio/video playback devices, etc.), and/or control devices 116-$n$.

In an embodiment, the media devices 114-$n$ may be integrated with, operatively coupled to, and/or connected to their respective display devices 112-$n$, control devices 116-$n$, and/or network 150. The media devices 114-$n$ may be configured to communicate with their respective display devices 112-$n$ and network 150. In various embodiments, the network 150 may include, without limitation, a computer and/or telecommunications network which may enable coupled and/or interconnected systems and/or devices to communicate information between and among each other. In various embodiments, the network 150 may include, without limitation, intranet, extranet, Internet, and/or any other local, regional, global telecommunications network.

In an embodiment, the platform server device(s) 120 may include, without limitation, one or more platform applications 124-$n$, a platform datastore 122, and a shared cache application 126. The platform datastore 122 may be generally arranged to store platform information and for management of content, media devices, content source systems, users or consumers and further discussed with respect to FIG. 3. The platform application(s) 124-$n$ may be generally arranged to provide various services to the one or more media devices 114-$n$, The various services may include, without limitation, authentication services, search services, user interface services, content services, command services, datastore services, further discussed with respect to FIG. 2. The shared cache application 126 may be generally arranged to provide a shared cache memory that may be used to cache information retrieved from platform datastore 122 and accessed by one or more media devices 114-$n$ and/or platform application(s) 124-$n$. The shared cache application 126 is also further discussed with respect to FIG. 3.

In an embodiment, the platform server device(s) 120 may be configured to receive command information from media devices 114-$n$ and may process the command information via the one or more platform applications 124-$n$ further discussed with respect to FIG. 2. In an embodiment, the media devices 114-$n$ may be configured to aurally and/or graphically present user interfaces and/or content on respective display devices 112-$n$ including any acoustic transducers (e.g., speakers, etc.) operatively coupled to the display devices 112-$n$.

For example, the media device 114-1 may be configured to acoustically, graphically, and/or visually present content on the display device 112-1 sourced from media device 114-1, the platform server device(s) 120, and/or the one or more content source systems 130-$n$.

In addition to or alternative to the above example, the media device 114-1 may be configured to provide the one or more user interface (UI) views and/or UI elements and associated acoustic information to display device 112-1 for acoustical, graphical, and/or visual presentation, where the UI views, UI elements, and/or associated acoustic information may be generated by the platform server device(s) 120, the one or more content source systems 130-$n$, or the media device 114-1.

In an embodiment, the control devices 116-$n$ may be configured to communicate user input information with the respective media devices 114-$n$ and may optionally include a touch screen display (not shown) and/or audio input and/or output (I/O) circuitry. For example, the control device 116-1 may be configured to use one or more wired and/or wireless communication protocols and/or standards, which may include, without limitation, infrared (IR) protocols and/or standards, radio frequency (RF) protocols and/or standards, and/or Bluetooth protocol and/or standard to communicate with the media device 114-1. In an embodiment, the control device 116-1 may be further configured to enable a consumer or user of a media device (e.g., media device 114-1) to navigate and/or make user selections from the UI views presented on a display device (e.g., display device 112-1).

Additionally or alternatively, the control device 116-1 itself may be configured to present at least a portion of the UI views on a touch screen display (not shown) connected and/or integrated with the control device 116-1 to enable a consumer or user of media device 114-1 to navigate, select, or otherwise interact with various content as previously discussed. Examples of control devices 116-$n$ may include, without limitation, remote controls and/or mobile devices.

In an embodiment, the content source systems 130-$n$ may include one or more content server devices 132-$n$ and associated content datastores 134-$n$. In one embodiment, content location information which may include, without limitation, network address and/or path of content stored within the content datastores 134-$n$, may be maintained within the platform server device(s) 120. In another embodiment, the network location of the content source systems 130-$n$ is maintained and stored within the platform server device 120 while the specific locations of corresponding content are managed locally by the content source systems 130-$n$. In yet another embodiment, the content location information including the network location and/or path of the content source systems 130-$n$ is embedded within the UI elements representative of selectable and/or viewable content displayed via the media devices 114-$n$ and/or display devices 112-$n$, such that interaction with the UI elements through the media devices 114-$n$ allows the selectable and/or viewable content located within the content source systems 130-$n$ to be accessible to the media devices 114-$n$.

In an embodiment, the content stored within the content datastores 134-$n$ may include music, video, multimedia, still pictures, text, graphics, gaming applications, and the like. In another embodiment, the particular content which is stored within the content datastores 134-$n$ may be requested and provided to the media devices 114-$n$ through the network 150.

By way of example, the media device 114-1 may communicate with platform server device(s) 120 to request specific content for aural and/or graphical presentation on display device 112-1. If the requested content is audio/video content, the platform server device(s) 120 may request the specific content from the one or more respective content source systems 130-*n* (e.g., content source system 130-1, etc.) via network 150, receive at least a portion of the specific content, and transmit or stream the at least a portion of the specific content to the media device 114-1 via network 150.

In addition to or alternative to the above example, the platform server device(s) 120 may provide content location information including network address and/or path of the respective content source systems 130-*n* (e.g., content source system 130-1, etc.) to the media device 114-1, and the media device 114-1 may subsequently directly request the specific content from the one or more respective content source systems 130-*n* (e.g., content source system 130-1, etc.), and receive at least a portion of the specific content transmitted or streamed by the one or more respective content source systems 130-*n* to the media device 114-1 via network 150 for aural and/or graphical presentation on display device 112-1.

FIG. 2 illustrates a block diagram of one or more platform applications configured according to an example embodiment. In an embodiment, the one or more platform applications 124-*n* may be stored in one or more platform server devices 120 and arranged for execution by the one or more platform server devices 120.

In an embodiment, each platform application (e.g., platform application 124-1, platform application 124-2, etc.) may include, without limitation, one or more platform components. The one or more platform components may further include, without limitation, platform authentication component (e.g., platform authentication component 210-1, etc.), platform search component (e.g., platform search component 212-1, etc.), platform user Interface (UI) component (e.g., platform user Interface (UI) component 214-1, etc.), platform content component (e.g., platform content component 216-1, etc.), platform command component (e.g., platform command component 218-1, etc.), platform datastore component (e.g., platform datastore component 220-1, etc.), and/or any other platform component.

In an embodiment, each platform application (e.g., platform application 124-1, platform application 124-2, etc.) may be associated with a specific version or revision. The specific version or revision may be representative of a specific configuration of the platform application and its associated components (e.g., platform authentication component 210-1, platform search component 212-1, etc.). Additionally or alternatively, each version of a platform application (e.g., platform application 124-1 configured as a first version of the platform application, etc.) may be further configured to communicate and interface with one or more associated versions of a media device (e.g., media device 114-1 configured as a first version of the media device, etc.).

For example, the platform application 124-1 may be configured as a first version of a platform application. The platform application 124-1 may be further configured to communicate and interface with media device 114-1 which may be configured as a first version of a media device. Similarly, the platform application 124-2 may be configured as a second version of the platform application. The platform application 124-2 may also be configured to communicate and interface with media device 114-2 which may be configured as a second version of the media device.

In an embodiment, the platform authentication component (e.g., platform authentication component 210-1, etc.) may be arranged to communicate with one or more associated versions of media devices 114-*n* and authenticate one or more users or consumers based on provided authentication information associated with the respective media devices 114-*n*. The authentication information may include information that enables a platform authentication component (e.g., platform authentication component 210-1, etc.) to authenticate, authorize, and enable a user or consumer to securely connect to the platform application (e.g., platform application 124-1) and access content stored in the content source systems 130-*n* for a particular user, consumer, and/or media device (e.g., media device 114-1, etc.).

In an embodiment, the authentication information may include, without limitation, login/user name, password, device identifier, IP addresses, email address, and/or the like. The authentication information may be stored in the platform datastore 122 as further discussed in FIG. 3. Once authenticated, the platform application 124 may enable the user or consumer to purchase, search, retrieve, or otherwise access content stored in content systems 130-*n*.

In an embodiment, the platform search component (e.g., platform search component 212-1, etc.) may be arranged to receive search requests from associated versions of media devices 114-*n* to search for content and/or indexed information within content and provide search results to respective media devices 114-*n* that transmitted a search request. The search requests may include, without limitation, one or more search terms and/or phrases representative of one or more words, phrases, and/or sentences. In an embodiment, the platform search component (e.g., search component 212-1, etc.) may be configured to match the one or more search terms and/or phrases or their equivalents (e.g., synonyms, etc.) utilizing for example, one or more search algorithms including natural language search algorithms, with content description information stored in the platform datastore 122.

In an embodiment, the UI component (e.g., UI component 214-1, etc.) may be arranged to generate customized UI information for associated versions of the one or more media devices 114-*n*. The generated customized UI information may include content such as, for example, audio, visual, and/or gaming content for selection by the consumers or users of the one or more media devices 114-*n* utilizing, for example, respective control devices 116-*n*. The UI component (e.g., UI component 214-1, etc.) may be further configured to provide the generated UI information to respective media devices 114-*n* for graphical and/or aural presentation via the respective display devices 114-*n*, which may enable a consumers or users to select and/or access content from the content source systems 130-*n*.

In an embodiment, the platform content component (e.g., platform content component 216-1) may be arranged to receive requests from associated versions of one or more media devices 114-*n* to access content stored in content source systems 130-*n* and provide the requested content directly to the media device 114-*n* as previously discussed based on user subscription information stored in platform datastore 122 and further discussed with respect to FIG. 3. Additionally or alternatively, the content component 124-5 may provide a response, where the response includes, without limitation, content location information. The content location information may include, without limitation, a network address and/or path of a particular content stored within the content datastores 134-*n*, so that the requesting media device (e.g., media device 114-1, etc.) may request to access the content and receive the content from content source system 130-*n* based on user subscription information stored in platform datastore 122 and further discussed with respect to FIG. 3.

In an embodiment, the platform command component (e.g., platform command component 218-1, etc.) may be arranged to process the command information received from associated versions media devices 114-n. The command information received from the media devices 114-n may include, without limitation, navigation commands and/or selection commands which may represent selection of content, request to access content, search for content, and/or an ongoing interaction with an application executing on the one or more platform server devices 120.

In an embodiment, the platform datastore component (e.g., platform datastore component 220-1, etc.) may be generally arranged to provide datastore access to one or more components of the platform application and may include, without limitation, a datastore access component 224-1, a key gen component 226-1, and a cache isolator component 228-1.

In an embodiment, the datastore access component 224-1 may be arranged to process one or more platform read requests and/or platform update requests with respect to information stored in the platform datastore 122 from one or more components of a platform application (e.g., platform application 124-1) and/or one or more media devices (e.g., media device 114-1, etc.). In response to the platform read requests, the datastore access component 224-1 may be configured to access the platform datastore 122 to retrieve the requested information, request to cache the retrieved information as a data item in the shared cache application 126, and provide the data item to the requesting components and/or requesting device. In response to the platform update requests, the datastore access component 224-1 may be configured to update the platform datastore 122 with updated information, update the data item cached by the shared cache application 126, and isolate a specific version of the data item cached within the shared cache application 126. The processing of the one or more platform read requests and/or platform update requests is further discussed with respect to FIGS. 6A-6C, 7, and 8A-8D.

In an embodiment, the key gen component 226-1 may be configured to generate a data item key based on a version agnostic identifier associated with a data item and a version specific identifier associated with a version of a platform application and/or media device. The data item key may be associated with and/or configured to identify a particular data item stored in a shared cache memory (e.g., shared cache memory 512) further discussed with respect to FIG. 5.

In an embodiment, the cache isolator component 228-1 may be configured to isolate one or more versions of data items cached by the shared cache application. To isolate a version of a data item, the cache isolator component 228-1 may be configured to determine one or more other versions of the platform application and/or media device, i.e., other versions of the platform application and/or media device excluding the version that is associated with the data item to be isolated. The cache isolator component 228-1 may be further configured to remove the one or more other versions of data items from a shared cache memory. The isolation of the one or more versions of data items is further discussed with respect to FIGS. 8A-8D.

In an embodiment, the key gen component 224-1 for a platform application (e.g., platform application 124-1, etc.) may be similarly configured with respect to other key gen components (e.g., key gen component 224-2 of plat form application 124-2, etc.) so that any of the one or more versions of the platform application 124-n may locate or find data item keys generated by any other version of the of the platform application 124-n. The cache isolator component 228-1 for each platform application 124-n may also be similarly configured with respect to other cache isolator components (e.g., cache isolator component 228-2 of plat- form application 124-2, etc.), so that any of the one or more versions of the platform application 124-n may remove obsolete cache data items generated and cached by other versions of the platform application 124-n.

FIG. 3 illustrates a block diagram of an embodiment of the platform datastore 122 of platform server device(s) 120. In particular, the platform datastore 122 may be implemented in the platform server device(s) 120 and/or stored in the platform server device(s) 120.

In an embodiment, the platform datastore 122 may include, without limitation, user profile information collection 302, user subscription information collection 304, user device information collection 306, and/or content description information collection 308.

In an embodiment, the user profile information collection 302 may include a collection of user profile information for each user or consumer. The user profile information may include, without limitation, authentication information (e.g., login/user name, etc.) as previously discussed and demographic information. The demographic information may include personal information associated with a particular user or consumer which may include, without limitation, name and address information, date of birth information, age and gender information, and/or the like.

In an embodiment, the user subscription information collection 304 may include a collection of user subscription information for each user or consumer. The user subscription information may include purchased or otherwise authorized content of a user or consumer, and the one or more content source systems 130-n that the purchased or otherwise authorized content is available to the user or consumer. It may be appreciated that the user subscription may be further associated or linked to the particular user profile information for that user or consumer.

In an embodiment, the user device information collection 306 may include a collection of user device information for media devices 114-n associated with each user or consumer. The device information may include hardware, firmware, and/or software version information for one or more components of a media device (e.g., media device 114-1), media device identifier information, network address information, and/or the like.

In an embodiment, the content description information collection 308 may include a collection of content description information for each content. As previously discussed, the content description information may include without limitation, content identifier information (e.g., hash, digest, etc.) that uniquely identifies a specific content accessible from one or more content source systems 130-n, content title information identifying the title of the content, content author information identifying authors of the content, content language information identifying one or more languages of the audio or acoustic portions and/or visual or graphical portions of the content, time information identifying the total length of time of the content, content artist information identifying one or more artists and/or actors of the content, production information identifying the entities, producers, and/or persons that produced the content, content location information identifying one or more network addresses and/or paths of the respective content source systems 130-n that the specific content is accessible, content episode information identifying an episode the content belongs to, content season information identifying a season the content belongs to, content album information identifying an album the content belongs to.

Figure 4:
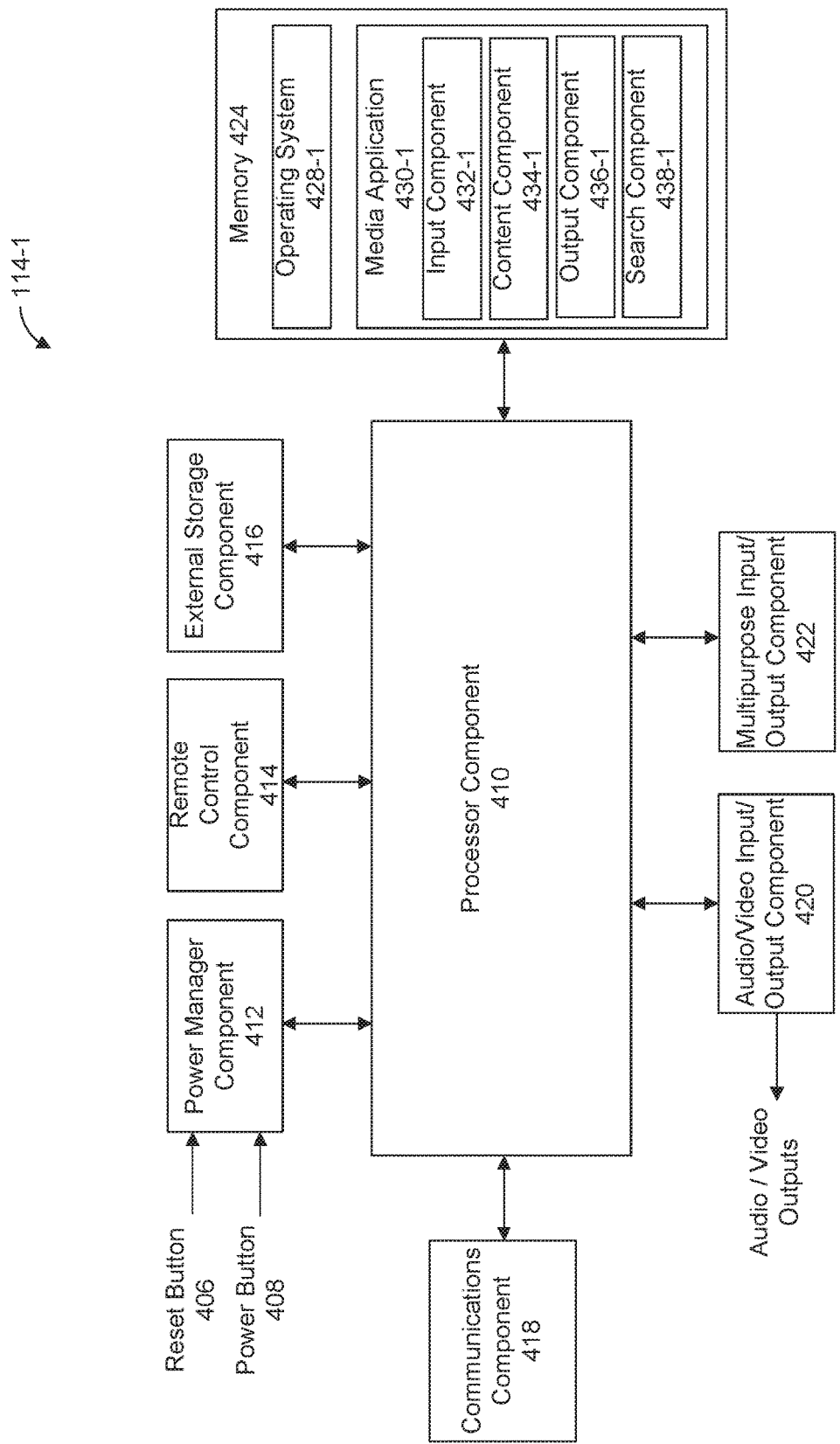
FIG. 4 illustrates a block diagram of an embodiment of the media device in an example embodiment.

FIG. 4 illustrates a block diagram of an embodiment of the media device 114-1 in an example embodiment. It may be appreciated that while FIG. 4 illustrates an embodiment for the media device 114-1, other media devices 114-n (e.g., media device 114-1, 114-2, etc.) may be configured substantially similar to the embodiment illustrated in FIG. 4 for media device 114-1.

In an embodiment, the media device 114-1 may be configured to communicate with their respective display devices 112-n and platform server device(s) 120-n and content source systems 130-n via network 150 in order to provide requested content for auditory graphical, and/or visual presentation on their respective display devices 112-n. The media device 114-1 may include, but is not limited to, memory 424, processor component 410, communications component 418, audio/video (A/V) input/output (I/O) component 420, multipurpose input/output (I/O) component 422, power manager component 412, remote control component 414, external storage component 416, each of the components and memory 424 may be operatively connected and/or coupled to each other.

In an embodiment, the processor component 410 may be generally arranged to execute instruction information including one or more instructions. In an embodiment, the processor component 410 may be a low power processor component or system-on-chip (SoC) processor component which may comprise, among other elements, processor circuit, which may include, but is not limited to, at least one set of electronic circuits arranged to execute one or more instructions. Examples of processor components 410 may include, but are not limited to, Qualcomm® Snapdragon®, Nvidia® Tegra®, Intel® Atom®, Samsung® Exynos, Apple® A7®, Apple® A8®, or any other type of mobile processor(s) arranged to execute the instruction information including the one or more instructions stored in memory 424.

In an embodiment, the memory 424 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., universal serial bus (USB) memory, solid state drives (SSD), etc.), and/or any other type of storage media configured for storing information.

In an embodiment, the communications component 418 may be generally arranged to enable the media device 114-1 to communicate, directly and/or indirectly, with platform server device(s) 120, and/or content source systems 130-n. The communications component 418 may include, among other elements, a radio frequency circuit configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the communications component 418 may be further include network interface circuit encoding and/or decoding information and receiving and/or transmitting the encoded information as electrical and/or optical signals consistent with one or more wired and/or optical network standards (e.g., Ethernet, Fibre Channel, etc.).

In an embodiment, the power manager component 412 may be generally arranged to manage the media device 114-1 in one or more power states and transitioning between the one or more power states. The one or more power states may include, without limitation, reset state, sleep state, power on state, and/or power off state. The power management component 412 may further be may also be operatively coupled to a power button 406 to transition the media device 114-1 between powered on state, sleep state, and/or power off state. The power management component 412 may also be operatively coupled to a reset button 408 to transition the media device 114-1 to a reset state which may be followed by the power on state.

In an embodiment, the remote control component 414 may be generally arranged to receive user input information from control device 116-1. The remote control component 414 may be configured to use one or more wireless communication protocols and/or standards, which may include, without limitation, infrared (IR) protocols and/or standards, radio frequency (RF) protocols and/or standards, and/or Bluetooth protocol and/or standard to communicate with the control device 116-1.

In an embodiment, the external storage component 416 may be generally arranged to store information in volatile and/or nonvolatile memory as previously discussed with respect to memory 424. Additionally or alternatively, the external storage component 416 may be further operatively coupled to external storage components (not shown) such as, for example, USB memory, SSD, hard disk drives (HDD), secure digital (SD) nonvolatile memory, and the like. The stored information may include, without limitation, information received from platform server device(s) 120, content source systems 130-n, one or more components and/or operating systems stored in memory 424, information generated by the one or more components and/or operating systems stored in memory 424, content, and/or the like.

In an embodiment, the A/V I/O component 420 may be generally arranged to communicate audio and/or video information operatively coupled to one or more components and/or devices. For example, the A/V I/O component 420 may be configured to output audio information and/or video information to display device 112-1 for acoustic, auditory, graphical, and/or visual presentation on the display device 112-1. The display device 112-1 may be operatively coupled and/or connected to the A/V IO component 420 via one or more audio and/or video interfaces.

In an embodiment, the one or more audio and/or video interfaces may include, without limitation, high definition multimedia interface (HDMI), display port (DP), Red-Green-Blue (RGB) component video, Separate Video (S-video), Digital Visual Interface (DVI), Video Graphics Array (VGA), Mobile High-Definition Link (MHL), composite video, analog audio, and/or Sony®/Philips® Digital interface (S/PDIF) digital audio, USB, Apple® Thunderbolt®, and/or the like.

In an embodiment, the multipurpose I/O component 422 may be generally arranged to communicate with one or more external devices via one or more interfaces. The one or more interfaces may include, without limitation, USB, Apple® Thunderbolt®, and/or the like. The one or more external devices (not shown) may include, without limitation, keyboards, mice, cameras, microphone, and the like.

In an embodiment, the memory 424 may include instruction information arranged for execution by the processor component 410. In that embodiment, the instruction information may be representative of at least one operating system 428-1, one or more applications, which may include, but is not limited to, media application 430-1.

In an embodiment, the operating system 428-1 may include, without limitation, embedded operating systems (e.g., Apple®, iOS®, Google® Android®, HP® WebOS®, Microsoft® Windows Embedded®, Microsoft® Windows®, Linux, etc.) general arranged to manage hardware resources (e.g., one or more components of the media device 114-1) and/or software resources (e.g., one or more applications of the media device 114-1).

In an embodiment the media application 430-1 may be generally arranged to enable a user or consumer to authenticate to the platform server device(s) 120. After authentication, the media application 430-1 may further enable a user or consumer to manage their user profile, and search, select, and/or playback of content received the platform server device(s) 120 and/or one or more content source systems 130-*n*. The media application 430-1 may include, without limitation, an input component 432-1, a content component 434-1, an output component 436-1, and/or a search component 438-1.

In an embodiment, the input component 432-1 may be generally arranged to interface with remote control component 414 and/or multipurpose I/O component 422 to receive user or consumer and/or process one or more commands including navigation commands and/or selection commands which may represent selection of content, search for content, and/or an ongoing interaction with an application executing on the platform server device(s) 120.

In an embodiment, the content component 434-1 may be generally arranged to receive, buffer, store, and/or stream a user or consumer selected content from the platform server device(s) 120 and/or one or more content source systems 130-*n*. The content component 434-1 may be also be generally arranged to provide the received, buffered, stored, and/or streamed content to display component 436-1 for auditory, aural and/or graphical presentation on a display device (e.g., display device 112-1) operatively coupled to the media device 114-1.

In an embodiment, the output component 436-1 may be generally arranged to generated audio and/or video information based on content received, buffered, stored, and/or streamed from platform server device(s) 120 and/or one or more content source systems 130-*n*. Additionally, the output component 436-1 may also be generally arranged to generate audio and/or video information based on content stored in memory 424 and/or memory operatively coupled to the external storage component 416. The output component 436-1 may be further arranged to generate the audio and/or video information based on customized UI information representative of one or more UI views (not shown) including one or more UI elements received from platform server device(s) 120 and/or generated by one or more components of memory 424 and/or operating system 428-1.

In an embodiment, the output component 436-1 may be arranged to provide the generated audio and/or video information to a display device (e.g., display device 112-1) operatively coupled to the A/V I/O component 420 in order to aurally and/or graphically present at least a portion of the generated audio and/or video information on the display device (e.g., display device 112-1).

In an embodiment, the search component 438-1 may be generally arranged to communicate with the platform server device(s) 120. In an embodiment, the search component 438-1 may be configured to receive one or more search queries from the user or consumer via the input component 432-1, where each search query may include, without limitation, one or more search terms and/or phrases. The search component 438-1 may be further configured to transmit the one or more search queries to the platform search component 124-2, where the platform search component 124-2 performs a search based on the received one or more search queries. The search component 438-1 may be further configured to receive one or more search results from the platform search component 124-2, in response to the transmission of the one or more search queries.

Figure 5:
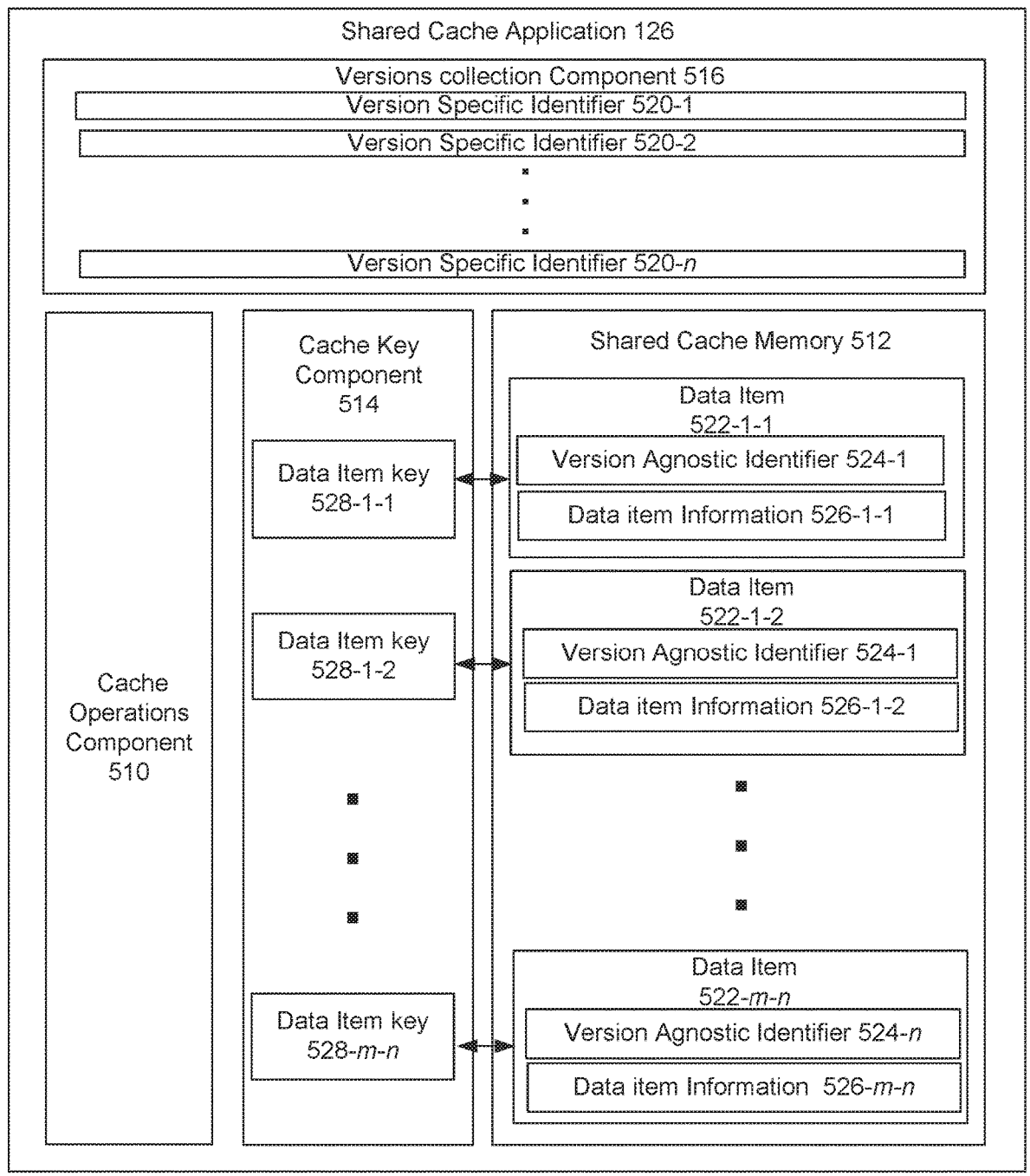
FIG. 5 illustrates a platform server device(s) including a shared cache application according to an example embodiment.

FIG. 5 illustrate a platform server device(s) including a shared cache application according to an example embodiment.

In an embodiment, the shared cache application 126 may be generated arranged to provide caching operations for information stored in the platform datastore 122. The shared cache application 126 may include, without limitation, a versions collection component 516, a cache operations component 510, a cache key component 514, and/or shared cache memory 512.

To provide the cache plasticity system 100 with a distributed and/or shared cache memory 512, each of the one or more components of the shared cache application 126 may be generally arranged to execute on one or more platform server devices 120. The one or more platform server devices 120 may be further operatively connected to each other via one or more communication infrastructures or buses (not shown) in order to facilitate the distributed operation of the shared cache application 126.

In an embodiment, the versions collection component 516 may be generally arranged to store and manage one or more active versions of one or more components and/or applications that may be configured to access the platform datastore 122.

In an embodiment, the versions collection component 516 may be configured to receive one or more platform registration requests from one or more components and/or applications to register one or more active versions of one or more components and/or applications in the one or more platform server devices 120. The platform registration request may include, without limitation, a version specific identifier (e.g., version specific identifier 520-1, etc.) associated with a version of a component and/or application.

The versions collection component 516 may also be configured to receive one or more active versions request to request for a collection of version specific identifiers that are currently active. In response, the versions collection component 516 may be configured to provide at least a portion of the collection of version specific identifiers to a requesting component and/or application.

In an embodiment, the cache operations component 510 may be generally arranged to manage cache access operations of one or more active versions of one or more components and/or applications that may be configured to access the platform datastore 122 and/or shared cache memory 512.

In an embodiment, the cache operations component 510 may be configured to receive one or more cache write requests to cache or store data items having associated data item keys. Each cache write request may include a data item and the associated data item key. In response, the cache operations component 510 may be configured to cache or store data items having associated data item keys in the shared cache memory 512 and cache key component 514.

In an embodiment, the cache operations component 510 may be configured to receive one or more cache update requests to update previously stored data items having associated data item keys. Each cache update request may include an updated data item and the associated data item key. In response, the cache operations component 510 may be configured to replace previously cached data items having associated data item keys in the shared cache memory 512 with corresponding updated data items.

The cache operations component 510 may also be configured to receive one or more cache read requests to read a previously cached data item based on a provided data item key. Each cache read request may include a data item key. In response, the cache operations component 510 may be configured search or locate the provided data item key in the cache key component 514 and provide a cache read response to a requesting component, application, and/or device. If the search finds the provided data item key in the cache component 514, cache operations component 510 may be configured to use the data item key (e.g., use a pointer or reference in the data item key, etc.) to retrieve the cached data item from the shared cache memory 512. When the search finds the provided data item key, the cache read response may include the cached data item. Otherwise, the cache read response may be a null or empty response.

In an embodiment, the cache operations component 510 may be configured to receive one or more cache removal requests to remove previously stored data items having associated data item keys. In response, the cache operations component 510 may be configured to remove the previously cached data items having associated data item keys in the shared cache memory 512 and the associated data item keys from the cache key component 514.

Optionally, the cache operations component 510 may be configured to automatically or periodically scan the cache key component 514 and/or shared ache memory 514 to remove any data item keys and their associated data items based on one or more cache replacement and/or expiration algorithms. By way of example, the cache operations component 510 may automatically remove any data item keys and their associated data items that have been cached in the shared cache memory for a specific period of time (e.g., 1 minute, 5, minutes, 10 minutes, 1 hour, etc.) Additionally or alternatively, the cache operations component 510 may automatically remove any data item keys and their associated data items using for example, least recently used (LRU) replacement algorithms to increase available shared cache memory, when additional shared cache memory is required to cache additional data items.

In an embodiment, the cache key component 514 may be generally arranged to store and manage one or more data item keys 528-*m-n*, where each data item key (e.g., data item keys 528-1-1, etc.)) may be associated with a cached data item stored in the shared cache memory 512 (e.g., cached data item 522-1-1, etc.) and may also identify the stored cached data item (e.g., cached data item 522-1-1, etc.). To identify and/or locate a data item cached in the shared cache memory 512, each data item key may also include a pointer or reference that may point to the location where the associated data item is stored in the shared cache memory 512.

In an embodiment, the shared cache memory 512 may be generally arranged to store and manage one or more cached data items 522-*m-n*, where each cached data item (e.g., data item key 528-1-1, etc.)) may be associated with a cached data item stored in the shared cache memory 512 (e.g., cached data item 522-1-1, etc.) and may also identify the stored cached data item (e.g., cached data item 522-1-1, etc.). Each cached data item (e.g., cached data item 522-1-1, etc.) may identify, include, and/or be associated with a version agnostic identifier (e.g., version agnostic identifier 524-1, etc.).

Each data item (e.g., data item 522-1-1, etc.) may also include data item information (e.g., data item information 526-1-1, etc.), which may be representative of information retrieved from the platform datastore 122. In one implementation, the data item information (e.g., data item information 526-1-1, etc.) may be further include one or more attribute-value pairs further illustrated and discussed with respect to FIGS. 6A-6C, 7, and 8A-8D, where each attribute may identify a datastore property stored in the platform datastore 122 and its associated value.

Figure 6A:
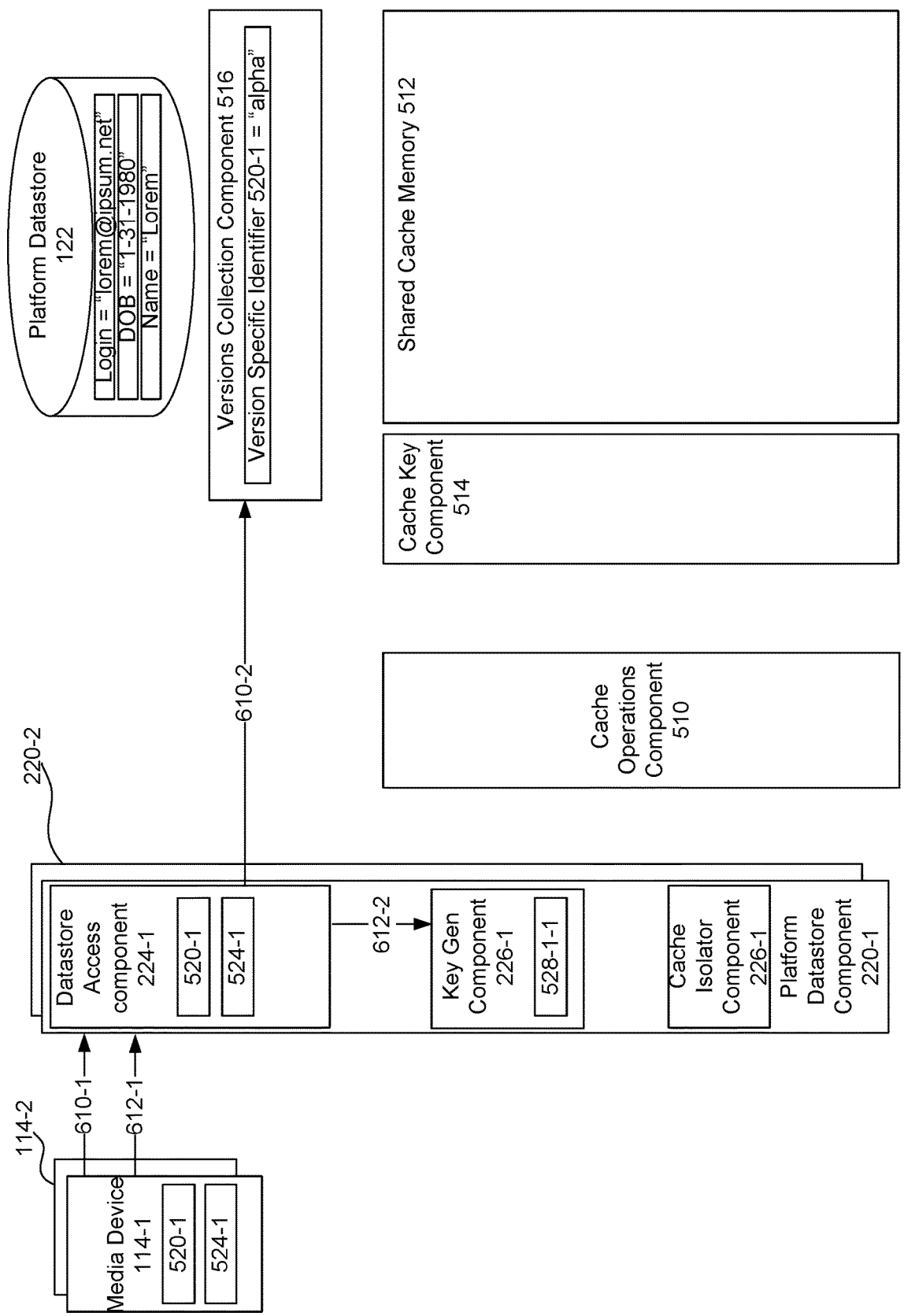
FIGS. 6A-6C illustrate a set of interactions for registering active versions and caching one or more data items according to an example embodiment.
Figure 6B:
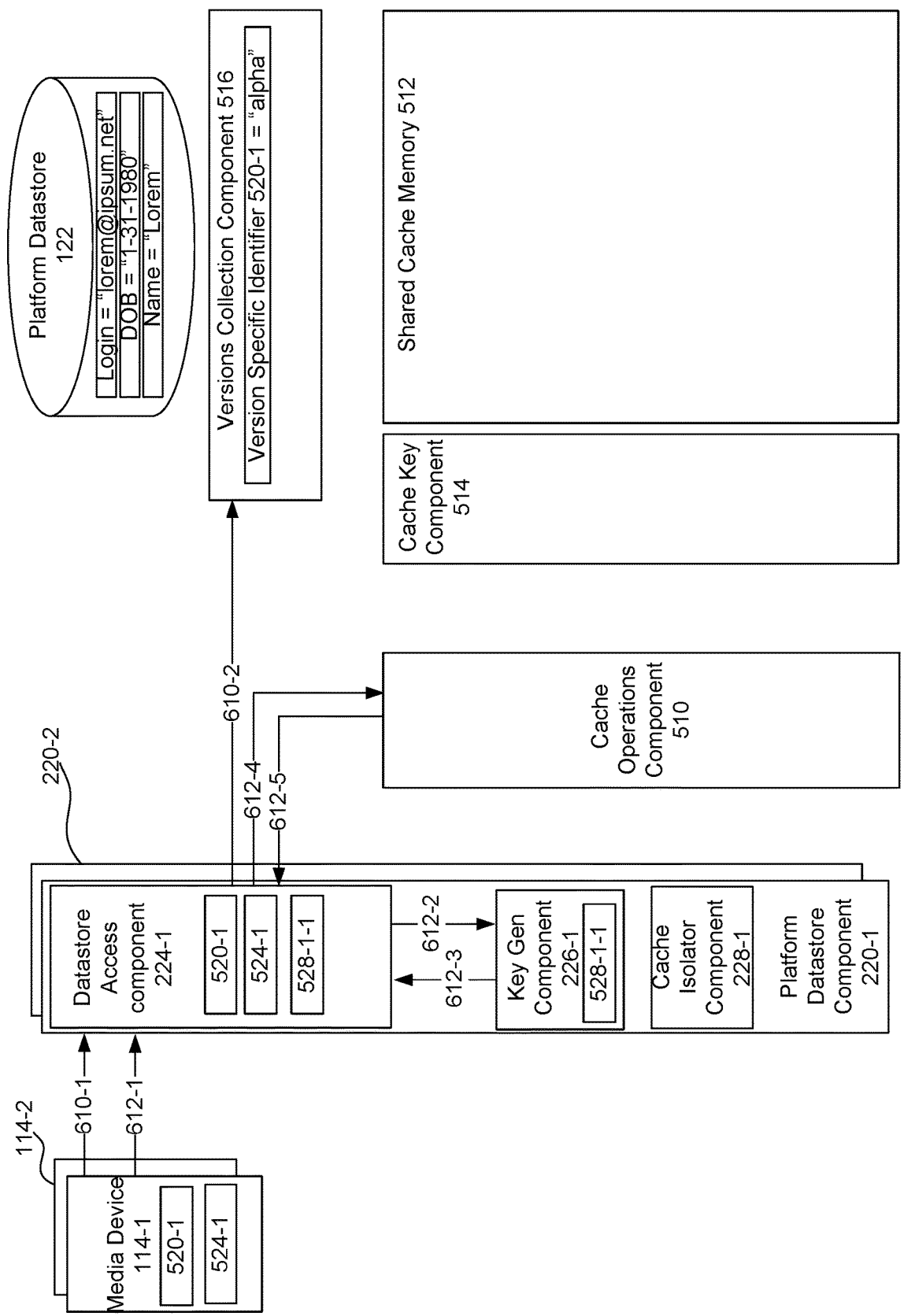
Figure 6C:
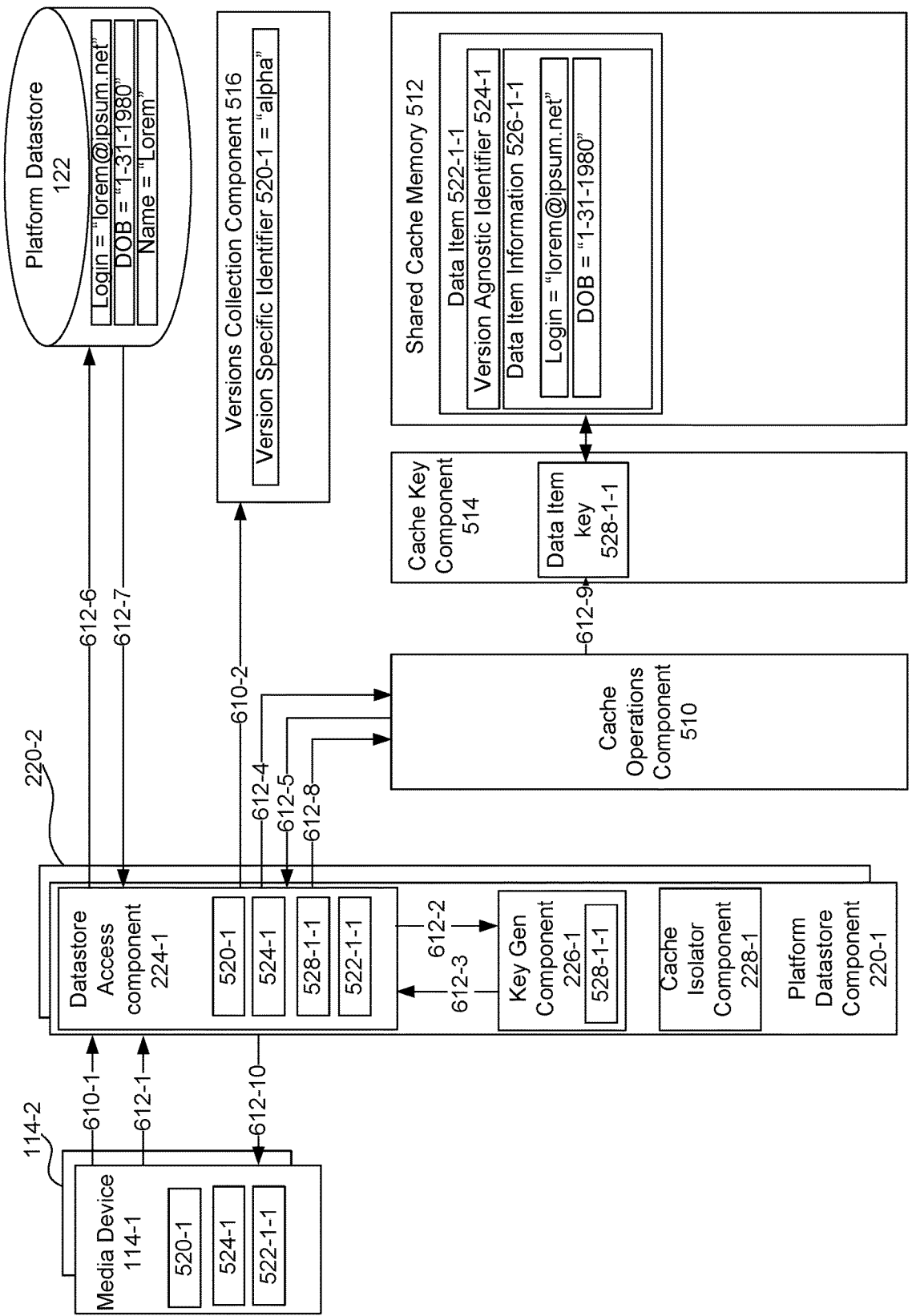

FIGS. 6A-6C illustrate functional and operational interactions (i.e., steps or stages) for registering an active version and caching one or more data items according to an example embodiment.

Before accessing the information stored in the platform datastore 122 and caching the information in the shared cache memory 512, one or more devices, components, and/or applications may register their associated version specific identifier with the versions collection component 516. It may be appreciated that by registering the one or more version specific identifiers, some or even all versions of the platform datastore component may use the one or more version specific identifiers stored in the versions collection component 516 to isolate one or more versions of one or more data items in the shared cache memory 512. The isolation of or more versions of one or more data items in the shared cache memory 512 is further discussed with respect to FIGS. 8A-8D. In an embodiment, the following set of interactions from step 610-1 to step 610-2 may be representative of a media device 114-1 and/or platform datastore component 220-1 registering their version specific identifier 520-1 with the versions collection component 516. The media device 114-1 and/or platform datastore component 220-1 may also be associated with a first version (e.g., version "alpha").

As illustrated in FIG. 6A, at step 610-1, the media device 114-1 may be optionally configured to transmit a platform registration request to the datastore access component 224-1. The platform registration request may request to register version specific identifier 520-1 associated with the media device 114-1. The platform registration request may include, without limitation, the version specific identifier 520-1 (e.g., version "alpha") associated with the media device 114-1.

At step 610-2, the datastore access component 224-1 may be configured to transmit a version registration request to the versions collection component 516 of the shared cache application 126. The version registration request may include the version specific identifier 520-1 associated with the datastore access component 224-1. Additionally or alternatively, the datastore access component 224-1 may be optionally configured to transmit a version registration request, in response to receiving the platform registration request from the media device 114-1. The version registration request may include the version specific identifier 520-1 received from the media device 114-1.

After registration, information stored in the platform datastore 122 may be accessed and cached in the shared cache memory 512. In an embodiment, the following set of interactions from step 612-1 to step 612-10 may be representative of a user or consumer using a media device 114-1 to access at least a portion of their user profile information stored in user profile information collection 302 of the platform datastore 122. Moreover, the media device 114-1 used by the user or consumer to access their user profile information may be associated with the first version (e.g., version "alpha") as previously discussed. The media device 114-1 may further communicate with one or more platform components of the platform application 124-1 to access their user profile information. The platform application 124-1 and the one or more platform components may be associated with a first version (e.g., version "alpha").

At step 612-1, the media device 114-1 may be configured to transmit a platform read request to the platform application 124-1 to request access to data item information associated with the first version of the media device 114-1 stored in the platform datastore 122. The platform read request may include a version agnostic identifier 524-1 identifying the associated data item information to be retrieved and/or optionally, a version specific identifier 520-1. The version agnostic identifier 524-1 may be shared or common across all versions of a data item associated with the version agnostic identifier 524-1. For example, at step 612-1, the media device 114-1 may transmit a platform read request to the platform application 124-1 to request access to user profile information of the user or consumer, to be retrieved from the platform datastore 122. The read request may include the user's or consumer's login/user name "lorem@ipsum.net" as the version agnostic identifier 524-1 and "alpha" as the version specific identifier 520-1.

At step 612-2, the datastore access component 224-1 may be configured to provide the version agnostic identifier 524-1 and the version specific identifier 520-1 to a key gen component 226-1. In response, the key gen component 226-1 may be configured to generate a data item key 528-1-1 based at least partially on the received version agnostic identifier 524-1 and version specific identifier 520-1. The data item key 528-1-1 may be associated with a data item configured to store the information retrieved from the platform datastore 122. For example, the datastore access component 224-1 may be configured to provide login/user name "lorem@ipsum.net" and "alpha" to the key gen component 226-1 to generate a data item key 528-1-1. In response, the key gen component 226-1 may prepend the version specific identifier 520-1 "alpha" to the version agnostic identifier 524-1 "lorem@ipsum.net" to create a data item key 528-1-1 of "alpha lorem@ipsum.net." Alternatively, the key gen component 226-1 may be configured to append the version specific identifier 520-1 "alpha" to the version agnostic identifier 524-1 "lorem@ipsum.net" to create a data item key 528-1-1 of "lorem@ipsum.net alpha."

As illustrated in FIG. 6B, at step 612-3, the key gen component 226-1 may be configured to provide the generated data item key 528-1-1 to the datastore access component 224-1. For example, the key gen component 226-1 may provide the generated data item key 528-1-1 of "alpha lorem@ipsum.net" or "lorem@ipsum.net alpha" to the datastore access component 224-1.

At step 612-4, the datastore access component 224-1 may be configured to transmit a cache read request to the cache operations component 510, in response to receiving the data item key 528-1-1. The cache read request may include the data item key 528-1-1. For example, at step 612-4, the datastore access component 224-1 may transmit a cache read request to the cache operations component 510 to attempt to retrieve a data item cached in the shared cache memory 512 having the associated data item key 528-1-1 of "alpha lorem@ipsum.net" or "lorem@ipsum.net alpha."

At step 612-5, the cache operations component 510 may be configured to determine whether the data item key 528-1-1 and its associated data item is stored in the cache component 514 and shared cache memory 512. To determine whether the data item key 528-1-1 and its associated data item is stored, the cache operations component 510 may search the cache key component 514 for the data item key 528-1-1. The cache operations component 510 may further provide a cache read response to the datastore access component 224-1. The cache read response may include a cached data item associated with the data item key 528-1-1, when the data item having the associated data item key 528-1-1 is located within the shared cache memory 512. Additionally or alternatively, when the data item having the associated data item key 528-1-1 is not located within the shared cache memory 512, cache read response may be a null response or empty response. For example, at step 612-5, the cache operations component 510 may search the cache key component 514 for the data item key 528-1-1 of "alpha lorem@ipsum.net" or "lorem@ipsum.net alpha." In this example, because the data item key 528-1-1 was not found within the cache key component 514, which indicates that the associated data item is not cached within the shared cache memory 512, the cache operations component 510 may provide a null response to the datastore access component 224-1.

As illustrated in FIG. 6C, at step 612-6, the datastore access component 224-1 may be configured to create a data item 522-1-1, which may be associated with the first version of the media device 114-1 and/or the first version of the platform datastore component 220-1 of the platform application 124-1, i.e., the first version data item 522-1-1. After creating the first version data item 522-1-1, the datastore access component 224-1 may be further configured to transmit a datastore read request to the platform datastore 122. The datastore read request may include the version agnostic identifier 524-1 and one or more attributes of the data item information 526-1-1 associated with the first version data item 522-1-1. The version agnostic identifier 524-1 may identify the one or more attribute-value pairs associated with the version agnostic identifier 524-1 to be retrieved from the platform datastore 122. For example, at step 612-6, the datastore access component 224-1 may create a first version data item 522-1-1. After creating the first version data item 522-1-1, the datastore access component 224-1 may transmit a datastore read request to the platform datastore 122. The datastore read request may include "lorem@ipsum.net" as the version agnostic identifier 524-1 identifying a particular user profile. The datastore read request may further identify a login attribute and a date-of-birth (DOB) attribute of the data item information 526-1-1, which may be representative of at least a portion of the user profile information to be retrieved for that particular user or consumer.

At step 612-7, the datastore access component 224-1 may be configured to receive a datastore read response from the platform datastore 122. The datastore read response may include the one or more attribute-value pairs of the data item information 526-1-1 associated with the version agnostic identifier 524-1. The datastore access component 224-1 may further store the received one or more attribute-value pairs of the data item information 526-1-1 in the newly created first version data item 522-1-1. The datastore access component 224-1 may also store the previously provided version agnostic identifier 524-1 with the data item 522-1-1. Additionally or alternatively, the datastore access component 224-1 may associate a portion of the data item information 526-1-1 (e.g., an attribute value of an attribute, etc.) as the version agnostic identifier 524-1. For example, at step 612-7, the datastore access component 224-1 may receive a datastore read response from the platform datastore 122, where the datastore read response may include the login attribute with a value of "lorem@ipsum.net" and the DOB attribute with a value of "1-31-1980" for the particular user profile information identified by "lorem@ipsum.net." The datastore access component 224-1 may store or associate "lorem@ipsum.net" as the version agnostic identifier 524-1 in the data item 522-1-1. The datastore access component 224-1 may also store a login attribute with a value of "lorem@ipsum.net" and a DOB attribute with a value of "1-31-1980" as the data item information 526-1-1 in the first version data item 522-1-1.

At step 612-8, the datastore access component 224-1 may be configured to transmit a cache write request to the cache operations component 510. The cache write request may include the data item key 528-1-1 and the first version data item 522-1-1. For example, at step 612-8, the datastore access component 224-1 may transmit a cache write request to the cache operations component 510 to store the data item key 528-1-1 in cache key component 514 and cache or store the first version data item 522-1-1 associated with the data item key 528-1-1 in the shared cache memory 512. As previously discussed, the data item key 528-1-1 may further include a pointer or reference that may point to the location where the associated the first version data item 522-1-1 is stored in shared cache memory 512.

At step 612-9, the cache operations component 510 may be configured to store the data item 522-1-1 in the shared cache memory 512, and its associated data item key 528-1-1 in the cache key component 514. As previously discussed, the cache key component 514 and the one or more data item keys (e.g., data item key 528-1-1, etc.) may be used by the cache operations component 510 to determine whether a data item key and its associated data item is stored within the cache key component 514 and shared cache memory 512. Although not illustrated, it may be appreciated that in some implementations, the actual data item key 528-1-1 stored in the cache key component 514 may be represented as a hash or a digest calculated based on at least a portion of the information within the data item key 528-1-1. The hash or digest may be generated utilizing one or more hashing algorithms, such as, for example, MD5 Message-Digest Algorithm, Secure Hash Algorithm 1 (SHA-1), Secure Hash Algorithm 2 (SHA-2), and/or the like.

At step 612-10, the datastore access component 224-1 may be configured to provide a platform read response to the media device 114-1. The platform read response may include the created first version data item 522-1-1 with data item information 526-1-1 retrieved from the platform datastore 122. For example, after step 612-8 or step 612-9, the data access component 224-1 may transmit the platform read response to the media device 114-1, in response to the platform read request received from media device 114-1. The platform read response may include the data item 522-1-1 and data item information 526-1-1, where the data item information 526-1-1 may be representative of at least a portion of the user profile information of the user or consumer.

FIG. 7 illustrates another set of operational and/or functional interactions for registering active versions and caching one or more data items according to an example embodiment.

Before accessing the information stored in the platform datastore 122 and caching the information as a data item in the shared cache memory 512, the media device 114-2 may be configured to performance a similar sequence of steps as those illustrated from steps 610-1 to 610-2 in FIG. 6A performed by the media device 114-1 and/or platform datastore component 220-1 to register their associated version specific identifier with the versions collection component 516. Thus, in an embodiment, the steps 710-1 to 710-2 of FIG. 7 may be representative of the media device 114-2 and/or platform datastore component 220-2 registering their associated version specific identifier 520-2 with the versions collection component 516. Moreover, steps 710-1 to 710-2 of FIG. 7 may also substantially correspond to steps 610-1 to 610-2, where the media device 114-2 and/or platform datastore component 220-2 of FIG. 7 may be associated with a second version (e.g., version "beta").

As illustrated in FIG. 7, at step 610-1, the media device 114-2 may be optionally configured to transmit a platform registration request to the versions collection component 516. The platform registration request may include a version specific identifier 520-2 (e.g., version "beta") associated with the media device 114-2.

At step 610-2, the datastore access component 224-2 may be configured to transmit a version registration request to register the version specific identifier 520-2 with the versions collection component 516 of the shared cache application 126. Additionally or alternatively, the datastore access component 224-2 may be optionally configured to transmit a version registration request to register the version specific identifier 520-2, in response to receiving the platform registration request from the media device 114-2. The version registration request may include the version specific identifier 520-2 received from the media device 114-2.

After registration, the media device 114-2 and/or platform datastore component 220-2 may be configured to store and/or access information in the platform datastore 122 and cache and/or access the information in the shared cache memory 512 in a manner substantially similar to the set of interactions illustrated in FIGS. 6A-6C. In an embodiment, the following set of interactions from steps 712-1 to 712-10 may substantially correspond with respect to steps 612-1 to 612-10 of FIGS. 6A-6C. The following set of interactions may also be representative of the user or consumer using a different version of the media device, i.e., media device 114-2 to access at least a portion of their user profile information stored in the user profile information collection 302 of the platform datastore 122. Thus, the media device 114-2 used by the user or consumer to access their user profile information may be associated with the second version (e.g., version "beta") as previously discussed. The media device 114-2 may further communicate with one or more platform components of the platform application 124-2 to access their user profile information. The platform application 124-2 and the one or more platform components may be associated with a second version (e.g., version "beta").

At step 712-1, the media device 114-2 may be configured to transmit a platform read request to the platform application 124-2 to request access to data item information associated with the second version of the media device 114-2 stored in the platform datastore 122. The platform read request may include a version agnostic identifier 524-1 and/or optionally, a version specific identifier 520-2.

At step 712-2, the datastore access component 224-2 may be configured to provide the version agnostic identifier 524-1 and the version specific identifier 520-2 to a key gen component 226-1. In response, the key gen component 130-2 may be configured to generate a data item key 528-1-2 based at least partially on the received version agnostic identifier 524-1 and version specific identifier 520-2. The data item key 528-1-2 may be associated with a data item configured to store the information retrieved from the platform datastore 122. For example, the datastore access component 224-2 may be configured to provide login name "lorem@ipsum.net" as the version agnostic identifier 524-1 and version "beta" as the version specific identifier 520-2 to the key gen component 130-2 to generate a data item key 528-1-2 in a substantially similar manner as discussed with respect to FIGS. 6A-6B. The data item key 528-1-2 may be "beta lorem@ipsum.net" or alternatively, "lorem@ipsum.net beta".

At step 712-3, the key gen component 226-2 may be configured to provide the generated data item key 528-1-2 to the datastore access component 224-2.

At step 712-4, the datastore access component 224-2 may be configured to transmit a cache read request to the cache operations component 510, in response to receiving the data item key 528-1-2. The cache read request may include the data item key 528-1-2.

At step 712-5, the cache operations component 510 may be configured to determine whether the data item key 528-1-2 and its associated data item is stored in the cache component 514 and shared cache memory 512 in a substantially similar manner as discussed with respect to step 612-5. The cache operations component 510 may further provide a cache read response to the datastore access component 224-2. The cache read response may include a cached data item having the associated data item key 528-1-2, when the data item is located within the shared cache memory 512. Additionally or alternatively, when the data item is not located within the shared cache memory 512, the cache read response may be a null response or empty response.

At step 712-6, the datastore access component 224-2 may be configured to create a data item 522-1-2, which may be associated with the second version of the media device 114-2 and/or second version of the platform datastore component 220-2, i.e., the second version data item 522-1-2. After creating the second version data item 522-1-2, the datastore access component 224-2 may be further configured to transmit a datastore read request to the platform datastore 122. The datastore read request may include the version agnostic identifier 524-1 and one or more attributes of the data item information 526-1-2 associated with the second version data item 522-1-2. The version agnostic identifier 524-1 may identify the one or more attribute-value pairs associated with the version agnostic identifier 524-1 to be retrieved from the platform datastore 122. For example, at step 612-6, the datastore access component 224-2 may create a second version user profile data item 522-1-2. After creating the second version user profile data item 522-1-2, the datastore access component 224-2 may transmit a datastore read request to the platform datastore 122. The datastore read request may include "lorem@ipsum.net" as the version agnostic identifier 524-1 identifying a particular user profile. The platform datastore read request may further identify a login attribute, a date-of-birth (DOB) attribute, and a name attribute of the data item information 526-1-2, which may be representative of at least a portion of the user profile information to be retrieved for that particular user or consumer.

At step 712-7, the datastore access component 224-2 may be configured to receive a datastore read response from the platform datastore 122. The datastore read response may include the one or more attribute-value pairs of the data item information 526-1-2 associated with the version agnostic identifier 524-1. The datastore access component 224-2 may further store the received one or more attribute-value pairs of the data item information 526-1-2 in the newly created second version data item 522-1-2. The datastore access component 224-2 may also store the previously provided version agnostic identifier 524-1 with the data item 522-1-2.

Additionally or alternatively, the datastore access component 224-2 may associate a portion of the data item information 526-1-2 (e.g., an attribute value of an attribute, etc.) as the version agnostic identifier 524-1. For example, at step 712-7, the datastore access component 224-1 may receive a datastore read response from the platform datastore 122, where the datastore read response may include the login attribute with a value of "lorem@ipsum.net," the DOB attribute with a value of "1-31-1980," and the name attribute with a value of "Lorem" for the particular user profile information identified by "lorem@ipsum.net." The datastore access component 224-2 may store or associate "lorem@ipsum.net" as the version agnostic identifier 524-1 in the data item 522-1-2. The datastore access component 224-2 may also store a login attribute with a value of "lorem@ipsum.net," a DOB attribute with a value of "1-31-1980," and a name attribute with a value of "Lorem" as the data item information 526-1-2 in the second version data item 522-1-2. It may be appreciated that the same version agnostic identifier 524-1 may be stored or associated with different versions of a data item, so that the different versions of a data item (e.g., first version data item 522-1-1 and second version data item 522-1-2) may share the same the version agnostic identifier 524-1 (e.g., "lorem@ipsum.net").

At step 712-8, the datastore access component 224-2 may be configured to transmit a cache write request to the cache operations component 510. The cache write request may include the data item key 528-1-2 and the second version data item 522-1-2.

At step 712-9, the cache operations component 510 may be configured store the data item 522-1-2 in the shared cache memory 512, and its associated data item key 528-1-2 in the cache key component 514. As previously discussed, the cache key component 514 and the one or more data item keys (e.g., data item key 528-1-1, data item key 528-1-2, etc.) may be used by the cache operations component 510 to determine whether a data item key and its associated data item is stored within the cache key component 514 and shared cache memory 512. Also previously discussed in some implementations, the actual data item key 528-1-2 stored in the cache key component 514 may be represented as a hash or a digest calculated based on at least a portion of the information within the data item key 528-1-2.

At step 712-10, the datastore access component 224-2 may be configured to provide platform read response to the media device 114-2. The platform read response may include the created second version data item 522-1-2 with data item information 526-1-2 retrieved from the platform datastore 122. For example, after step 712-8 or step 712-9, the data access component 224-2 may transmit the platform read response, in response to the platform read request received from media device 114-2. The platform read response may include the data item 522-1-2 and data item information 526-1-2, where the data item information 526-1-2 may be representative of at least a portion of the user profile information of the user or consumer.

FIGS. 8A-8D illustrate a set of operational and/or functional interactions for updating an attribute that is in common with a first version of a data item and a second version of the data item according to an example embodiment.

Figure 8A:
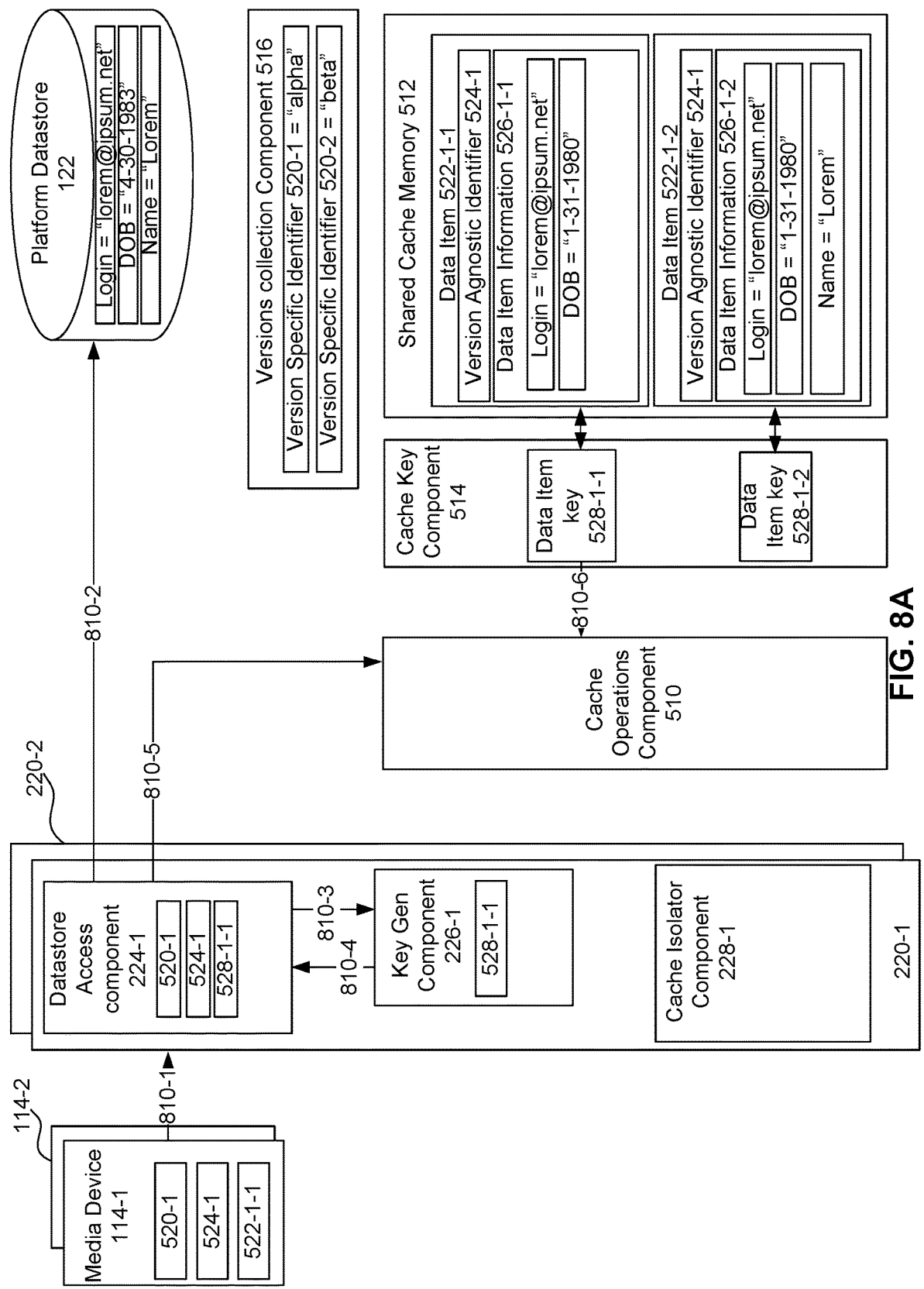
FIGS. 8A-8D illustrate a set of interactions for updating an attribute that is in common with a first version of a data item and a second version of the data item according to an example embodiment.

The following set of interactions from step 810-1 to step 810-16 may be representative of a user or consumer utilizing the media device 114-1 to update their user profile (e.g., update date of birth from "1-31-1980" to "4-30-1983") that is stored in the platform datastore 122 and previously cached in the shared cache memory 512. Moreover, the user profile information may have been previously accessed from the media device 114-1, which may be the first version (e.g., version "alpha") media device as discussed with respect to FIGS. 6C-6C. The user profile may also have been previously accessed from the media device 114-2, which may be the second version (e.g., version "beta") media device as discussed with respect to FIG. 7. Thus, as illustrated in FIG. 8A, the cache key component 514 and the shared cache memory 512 may initially include data item key 528-1-1 and its associated first version data item 522-1-1. The cache key component 514 and the shared cache memory 512 may also initially include data item key 528-1-2 and its associated second version data item 522-1-2.

As illustrated in FIG. 8A, at step 810-1, the media device 114-1 may be configured to transmit a platform update request to update an attribute-value pair for a previously accessed data item 522-1-1. The platform update request may include the version agnostic identifier 524-1 and the updated attribute-value pair. The updated attribute-value pair may include the attribute and its associated updated attribute value. The platform update request may also optionally include a version specific identifier 520-1. For example, at step 810-1, media device 114-1 may transmit an platform update request to update attribute value "1-31-1980" associated with DOB attribute for previously accessed first version data item 522-1-1. The platform update request may include "lorem@ipsum.net" as the version agnostic identifier 524-1 and the DOB attribute with "4-30-1983" as the associated attribute value. The platform update request may also optionally include version "alpha" as the version specific identifier 520-1.

At step 810-2, the datastore access component 224-1 may transmit a datastore update request to the platform datastore 122 to update information in the platform datastore 122, in response to receiving the platform update request. The datastore update request may include the version agnostic identifier 524-1, and an attribute-value pair associated with data item information 526-1-1 to be updated. For example, at step 810-2, the datastore access component 224-1 may transmit a datastore update request to the platform datastore 122 to update DOB attribute in the platform datastore 122, in response to receiving the platform update request. The datastore update request may include "lorem@ipsum.net" as the version agnostic identifier 524-1 that identifies a particular user profile. The datastore update request may also include a DOB attribute with an attribute value of "4-30-1983" to be updated for that particular user profile.

At step 810-3, the datastore access component 224-1 may be configured to provide the version agnostic identifier 524-1 and the version specific identifier 520-1 to the key gen component 226-1 in a similar manner as discussed in step 612-2 of FIG. 6A. The key gen component 226-1 may also generate a data item key 528-1-1 in a similar manner as discussed in step 612-2 of FIG. 6A.

At step 810-4, the key gen component 226-1 may be configured to provide the generated data item key 528-1-1 to the datastore access component 224-1 in a similar manner as discussed in step 612-3 of FIG. 6B.

At step 810-5, the datastore access component 224-1 may transmit a cache read request to the cache operations component 510 in a similar manner as discussed in step 612-4 of FIG. 6B. The cache read request may include the data item key 528-1-1.

At step 810-6, the cache operations component 510 may be configured to determine whether the data item key 528-1-1 and its associated data item is stored in the cache component 514 and shared cache memory 512. To determine whether the data item key 528-1-1 and its associated data item is stored, the cache operations component 510 may search the cache key component 514 for the data item key 528-1-1. The cache operations component 510 may further retrieve cached data item associated with the data item key 528-1-1 from the shared cache memory 512, when the cached data item is located within the shared cache memory 512. For example, at step 810-6, the cache operations component 510 may search the cache key component 514 for the data item key 528-1-1. In this example, because the data item key 528-1-1 is found within the cache key component 514, which indicates that the associated data item 522-1-1 is cached within the shared cache memory 512, the cache operations component 510 may use the pointer or reference in the data item key 528-1-1 to retrieve data item 522-1-1 from shared cache memory 512.

Figure 8B:
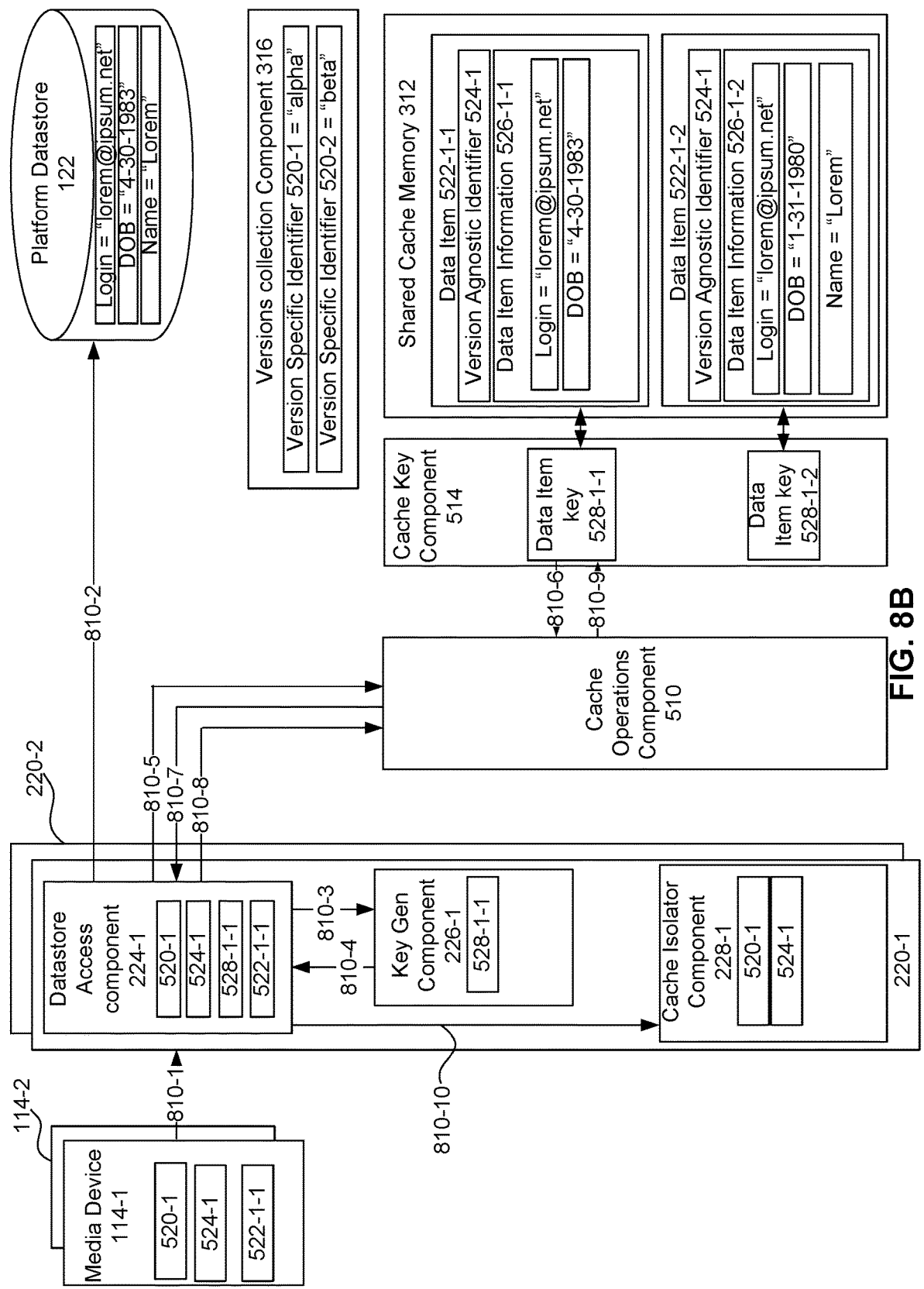

As illustrated in FIG. 8B, at step 810-7, the cache operations component 510 may be configured to provide a cache read response to the datastore access component 224-2. The cache read response may include the retrieved data item 522-1-1.

At step 810-8, the datastore access component 224-1 may be configured to update the data item information 526-1-1 of the retrieved data item 522-1-1 based on the platform update request. After updating the data item information 526-1-1, the datastore access component 224-2 may transmit a cache update request to the cache operations component 510 to update the first version data item 522-1-1 located in the shared cache memory 512. The cache update request may include the data item key 528-1-1 and the updated first version data item 522-1-1. For example, at step 810-8, the datastore access component 224-1 may update DOB attribute of the data item information 526-1-1 of the retrieved first version data item 522-1-1 with an attribute value of "4-30-1983." After updating the DOB attribute, the datastore access component 224-1 may transmit a cache update request to the cache operations component 510 to update the shared cache memory 512 with the updated first version data item 522-1-1.

At step 810-9, the cache operations component 510 may be configured to update the data item information 526-1-1 of the previously cache data item 522-1-1, in response to the cache update request. For example, at step 810-9, in response to the cache update request, the cache operations component 510 may replace the first version data item 522-1-1 associated with the data item key 528-1-1 with the updated first version data item 522-1-1 received in the cache update request.

At step 810-10, the datastore access component 224-1 may be configured to provide version specific identifier 520-1 and version agnostic identifier 524-1 to the cache isolator component 228-1 to isolate a specific version of the data item 522-1-1 identified by the version specific identifier 520-1 and version agnostic identifier 524-1 within the shared cache memory 512. For example, At step 810-10, the datastore access component 224-1 may provide version "alpha" as the version specific identifier 520-1 and "lorem@ipsum.net" as the version agnostic identifier 524-1 to the cache isolator component 228-1 to isolate the version "alpha" of the user profile information identified by "lorem@ipsum.net" in shared cache memory 512.

It may be appreciated that by isolating a specific version of the data item 522-1-1 in the shared cache memory 512, any other versions of the data item 522-1-1, such as, for example, second version data item 522-1-2 that may have been previously cached within the shared cache memory 512 may be removed. This removal may in turn, cause a later platform read request for data item information 526-1-2 of the second version data item 522-1-2 to be retrieved from the platform datastore 122 and cached in the shared cache memory 512 in a similar manner as the steps illustrated and discussed with respect to FIG. 7. In effect, for attribute-value pairs shared between the data item information 522-1-1 of the first version data item 522-1-1 and data item information 522-1-2 of the second version data item 522-1-2 (e.g., login attribute, DOB attribute), any updates to the shared attribute-value pairs in the platform datastore 122 may also be propagated to the data item information 522-1-2 of the second version data item 522-1-2, when the data item information 526-1-2 of the second version data item 522-1-2 is retrieved from the platform datastore 122.

Figure 8C:
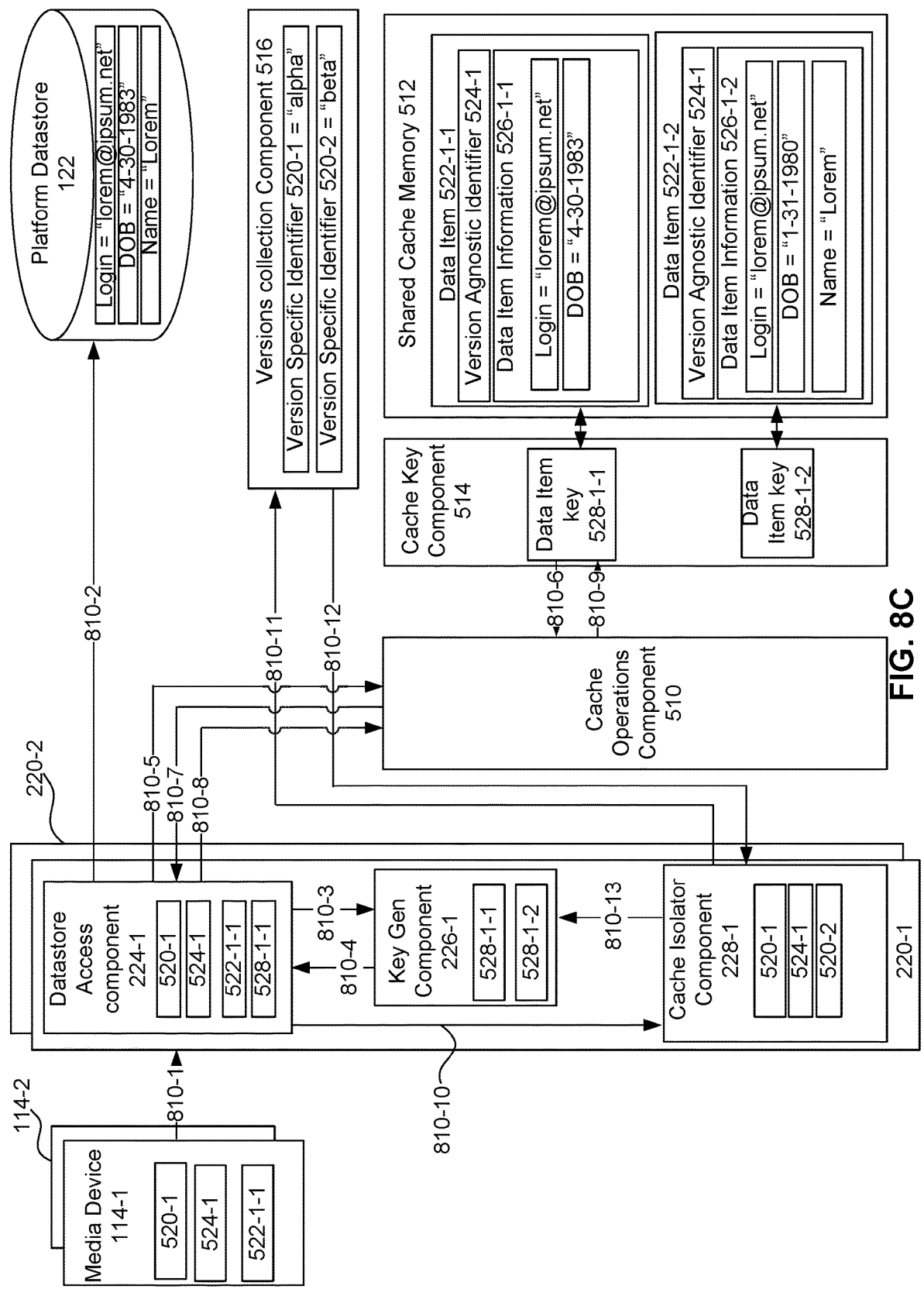

As illustrated in FIG. 8C, at step 810-11, the cache isolator component 228-1 may be configured to transmit an active versions request to the versions collections component 516 to retrieve a collection of other active versions of the media devices 114-*n* and/or the platform application(s) 124-*n*. The active versions request may include the version specific identifier 520-1.

At step 810-12, the versions collection component 516 may be configured to transmit an active versions response to the cache isolator component 228-1 based on the received active versions request. For example, at step 810-12, the versions collection component 516 may transmit an active versions response to the cache isolator component 228-1. The active versions response may include a collection of version specific identifiers excluding the version specific identifier 520-1 received from the cache isolator component 228-1. Thus, the active versions response may include version specific identifier 520-2.

At step 810-13, cache isolator component 228-1 may be configured to provide the version agnostic identifier 524-1 with each version specific identifier in the collection of version specific identifiers to the key gen component 226-1 to generate one or more data item keys associated with one or more versions of a data item. For each pair of version specific identifier and version agnostic identifier 524-1, the key gen component 226-1 may also generate a data item key in a similar manner as discussed in step 612-2 of FIG. 6A. For example, at step 810-13, the cache isolator component 228-1 may provide "lorem@ipsum.net" as the version agnostic identifier 524-1 and version "beta" as the version specific identifier 520-2 in the collection of version specific identifier to the key gen component 226-1. In response, the key gen component 226-1 may generate the data item key 528-1-2, where the generated data item key 528-1-2 may be "beta lorem@ipsum.net" or alternatively, "lorem@ipsum.net beta" depending upon the implementation.

Figure 8D:
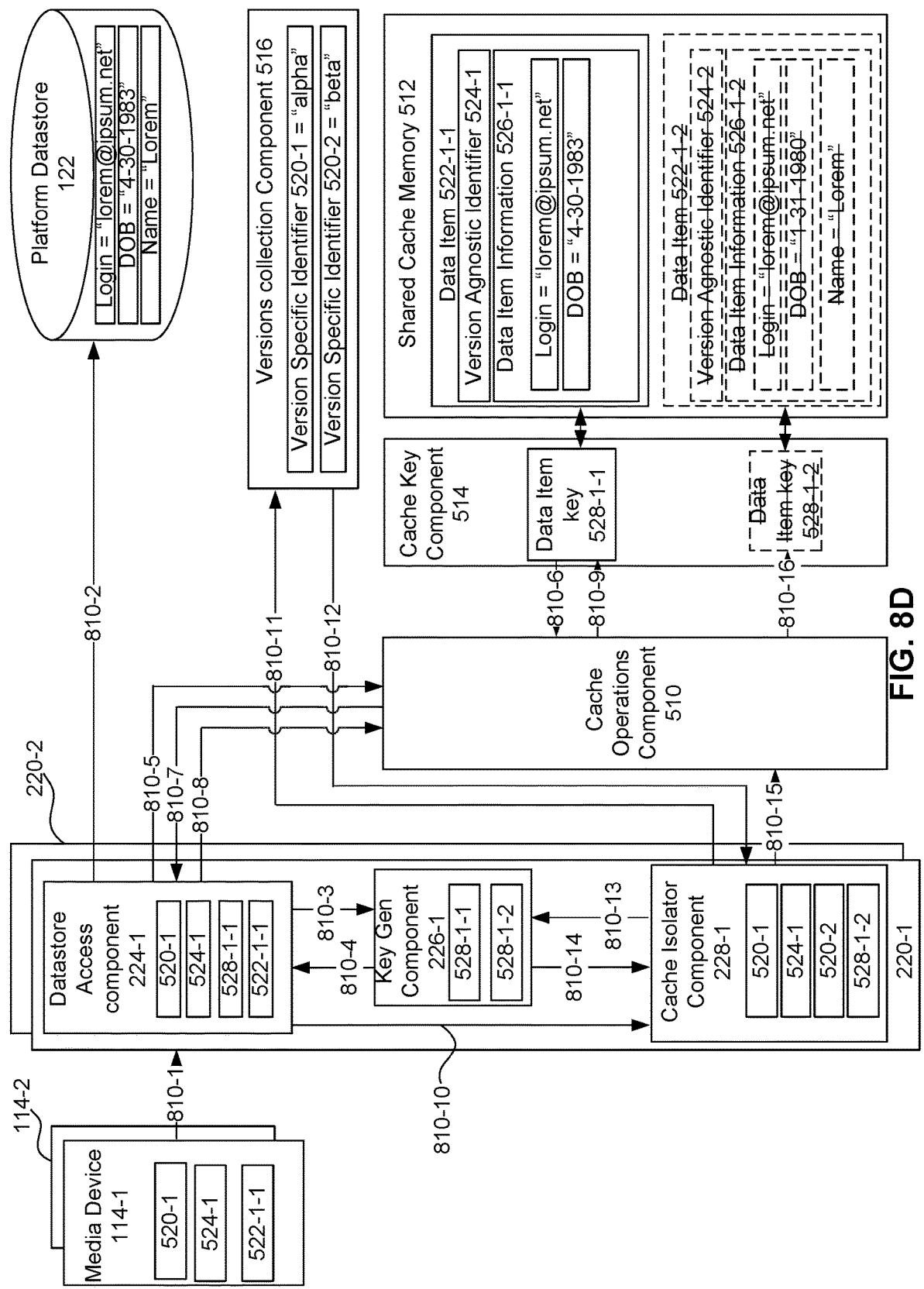

As illustrated in FIG. 8D, at step 810-14, the key gen component 226-1 may be configured to provide the generated data item keys to the cache isolator component 228-1, for each pair of version specific identifier and version agnostic identifier 524-1 received from the cache isolator component 228-1. For example, the key gen component 226-1 may provide the generated data item key 528-1-2 of "beta lorem@ipsum.net" or "lorem@ipsum.net beta" to the cache isolator component 228-1, in response to receiving "lorem@ipsum.net" as the version agnostic identifier 524-1 and version "beta" as the version specific identifier 520-2.

At step 810-15, the cache isolator component 228-1 may be configured to transmit a cache removal request to remove data items having associated generated data item keys, in response to receiving the generated data item keys. The cache removal request may include the one or more generated data item keys. For example, at step 810-15, the cache isolator component 228-1 may transmit a cache removal request to the cache operations component 510 to remove second version data item 528-1-2 from the shared cache memory 512 and remove the data item key 528-1-2 from the cache key component 514. The cache removal request may include the generated data item key 528-1-2.

At step 810-16, the cache operations component 510 may be configured to remove the second version data item 522-1-2 from the shared cache memory 512 and remove the data item key 528-1-2 from the cache key component 514, in response to the cache removal request (illustrated in dashed lines and strike through texts).

Figure 9A:
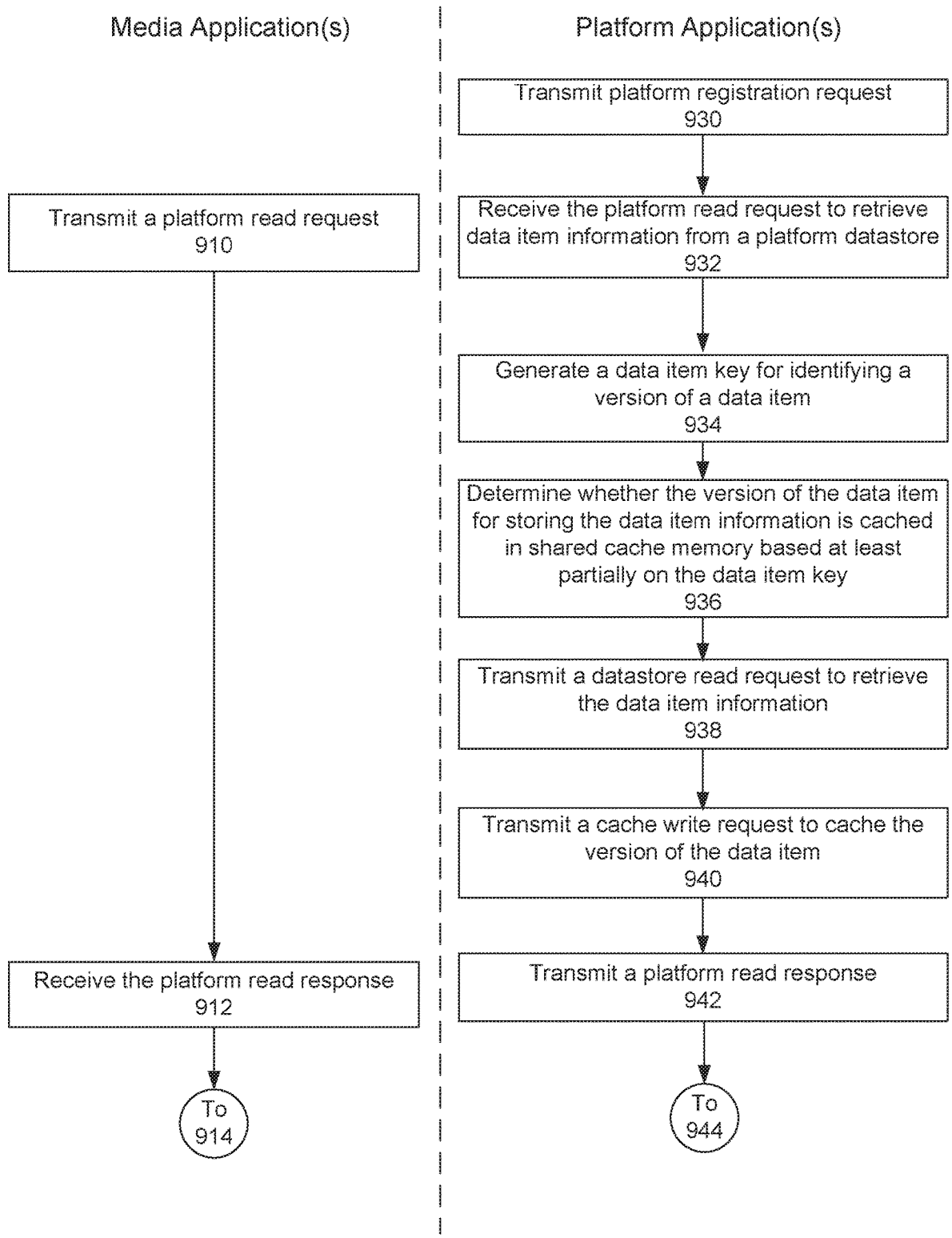
FIGS. 9A-9B illustrate processing operations that may be performed by the media device and platform server device(s) according to an example embodiment.
Figure 9B:
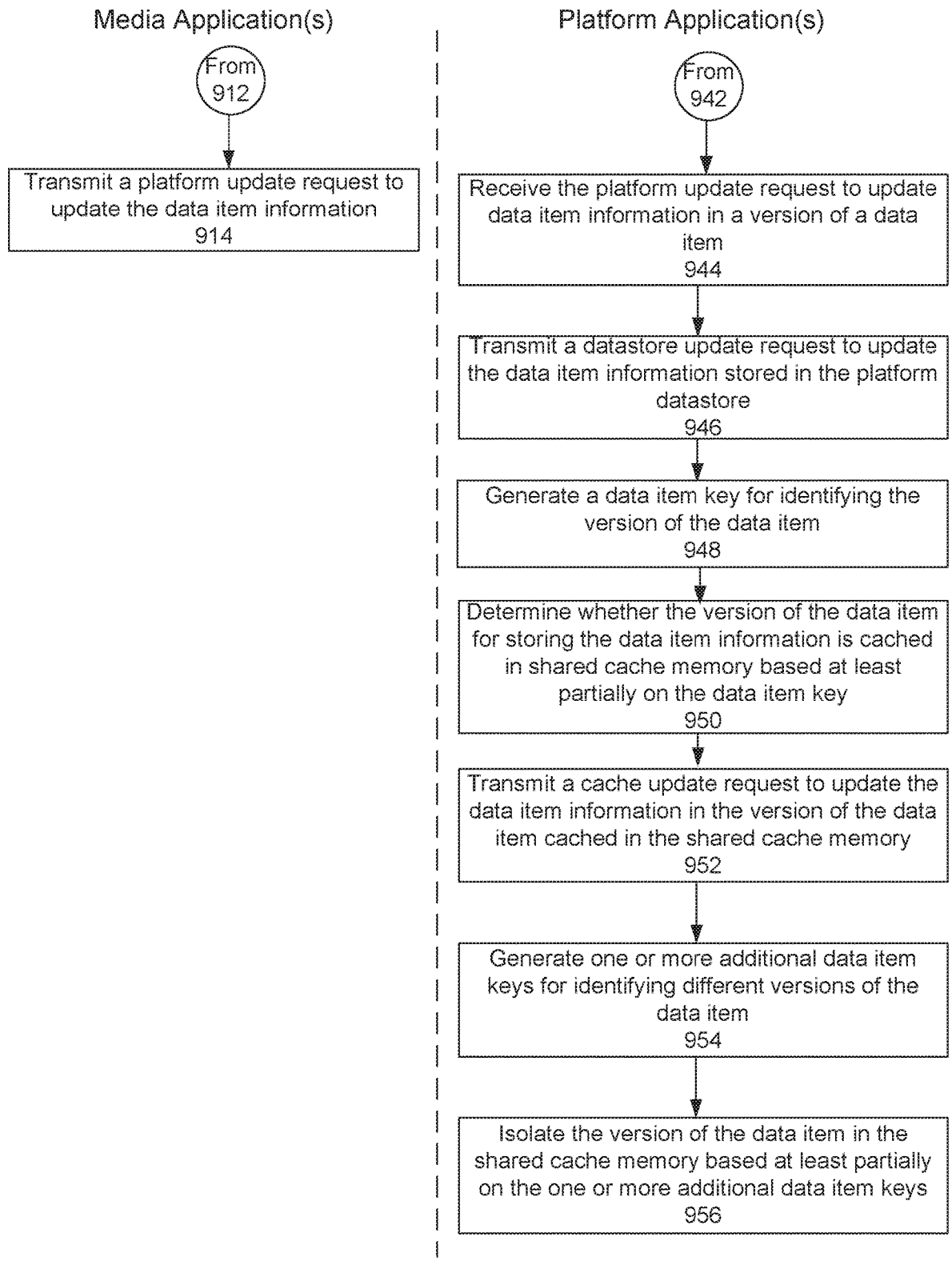

FIGS. 9A and 9B illustrate processing operations that may be performed by the media application(s) and/or platform application(s) according to an example embodiment.

As illustrated in FIG. 9A, at step 930, the platform application may receive a platform read request to retrieve data item information from a platform datastore. For example, at step 930, the platform datastore component (the platform datastore component 220-1, 220-2, etc.) of the respective platform application (e.g., platform application 124-1, 124-2, etc.) may transmit a platform registration request to the versions collection component 516 to register their versions identified by their respective version specific identifier (e.g., version specific identifier 520-1, 520-2, etc.).

At step 932, the platform application may receive the platform read request to retrieve data item information from a platform datastore. For example, at step 932, the platform datastore component (the platform datastore component 220-1, 220-2, etc.) of the respective platform application (e.g., platform application 124-1, 124-2, etc.) may receive the platform read request to retrieve data item information (e.g., data item information 526-1-1, 526-1-2, etc.) from a platform datastore 122, in response to the platform read request transmitted by a media application (e.g., media application 430-1, 430-2, etc.) at step 910.

At step 934, the platform application may generate a data item key for identifying a version of a data item. For example, at step 934, the platform datastore component (the platform datastore component 220-1, 220-2, etc.) of the respective platform application (e.g., platform application 124-1, 124-2, etc.) may generate a data item key (e.g., a first data item key, a second data item key, etc.) for identifying a version of a data item (e.g., a first version of a data item, a second version of a data item, etc.).

At step 936, the platform application may determine whether the version of the data item for storing the data item information is cached in shared cache memory based at least partially on the data item key. For example, at step 936, the platform datastore component (the platform datastore component 220-1, 220-2, etc.) of the respective platform application (e.g., platform application 124-1, 124-2, etc.) may determine whether the version of the data item (e.g., a first version of a data item, a second version of a data item, etc.) for storing the data item information (e.g., data item information 526-1-1, 526-1-2, etc.) is cached in shared cache memory, by at least transmitting a cache read request to a cache operations component 510 and receiving a null or empty cache read response from the cache operations component 510. The cache read request may include the generated data item key.

At step 938, the platform application may transmit a datastore read request to retrieve the data item information. For example, at step 938, the platform datastore component (the platform datastore component 220-1, 220-2, etc.) of the respective platform application (e.g., platform application 124-1, 124-2, etc.) may transmit a datastore read request to the platform datastore 122 to retrieve data item information (e.g., data item information 526-1-1, 526-1-2, etc.) from the platform datastore 122. The platform datastore component may also receive a datastore read response from the platform datastore 122, which may include the data item information.

At step 940, the platform application may transmit a cache write request to cache the version of the data item. For example, at step 940, the platform datastore component (the platform datastore component 220-1, 220-2, etc.) of the respective platform application (e.g., platform application 124-1, 124-2, etc.) may transmit a cache write request to the cache operations component 510 to cache the version of the data item (e.g., a first version of a data item, a second version of a data item, etc.) in a shared cache memory 512. The cache write request may include the version of the data item including the data item information. The version of the data item (e.g., a first version of a data item, a second version of a data item, etc.) may include the respective data item information (e.g., data item information 526-1-1, 526-1-2, etc.) retrieved from the platform datastore 122.

At step 942, the platform application may transmit a platform read response. For example, at step 942, the platform datastore component (the platform datastore component 220-1, 220-2, etc.) of the respective platform application (e.g., platform application 124-1, 124-2, etc.) may transmit a platform read response to the respective media application (e.g., media application 430-1, 430-2, etc.), in response to receiving the platform read request from the respective media application at step 932. The platform read response may include the data item and/or the data item information. The respective media application (e.g., media application 430-1, 430-2, etc.) may also receive the platform read response at step 912.

FIG. 9B illustrates a continuation of the processing operations that may be performed by the media application(s) and/or the platform application(s) illustrated in FIG. 9A according to the example embodiment.

As illustrated in FIG. 9B, at step 944, the platform application may receive a platform update request to update data item information in a version of a data item. For example, at step 944, the platform datastore component (the platform datastore component 220-1, 220-2, etc.) of the respective platform application (e.g., platform application 124-1, 124-2, etc.) may receive a platform update request to update data item information (e.g., data item information 526-1-1, 526-1-2, etc.) in a version of a data item (e.g., a first version of a data item, a second version of a data item, etc.), in response to the platform update request transmitted by a media application (e.g., media application 430-1, 430-2, etc.) at step 914. The platform update request may include updated data item information.

At step 946, the platform application may transmit a datastore update request to update data item information stored in the platform datastore. For example, at step 946, the platform datastore component (the platform datastore component 220-1, 220-2, etc.) of the respective platform application (e.g., platform application 124-1, 124-2, etc.) may transmit a datastore update request to the platform datastore 122 to update data item information (e.g., data item information 526-1-1, 526-1-2, etc.) stored in the platform datastore 122. The datastore update request may include updated data item information.

At step 948, the platform application may generate a data item key for identifying a version of a data item. For example, at step 948, the platform datastore component (the platform datastore component 220-1, 220-2, etc.) of the respective platform application (e.g., platform application 124-1, 124-2, etc.) may generate a data item key (e.g., a first data item key, a second data item key, etc.) for identifying the version of the data item (e.g., a first version of a data item, a second version of a data item, etc.).

At step 950, the platform application may determine whether the version of the data item for storing the data item information is cached in shared cache memory based at least partially on the data item key. For example, at step 950, the platform datastore component (the platform datastore component 220-1, 220-2, etc.) of the respective platform application (e.g., platform application 124-1, 124-2, etc.) may determine whether the version of the data item (e.g., a first version of a data item, a second version of a data item, etc.) for storing the data item information (e.g., data item information 526-1-1, 526-1-2, etc.) is cached in shared cache memory 512, by at least transmitting a cache read request to a cache operations component 510 and receiving a cache read response from the cache operations component 510. The cache read request may include the generated data item key (e.g., a first data item key, a second data item key, etc.), and the cache read response may include the version of the data item (e.g., a first version of a data item, a second version of a data item, etc.) cached in the shared cache memory 512.

At step 952, the platform application may transmit a cache update request to update the data item information in the version of the data item cached in the shared cache memory. For example, at step 952, the platform datastore component (the platform datastore component 220-1, 220-2, etc.) of the respective platform application (e.g., platform application 124-1, 124-2, etc.) may transmit a cache update request to update the data item information (e.g., data item information 526-1-1, 526-1-2, etc.) in the version of the data item cached (e.g., the first version of the data item, the second version of the data item, etc.) in the shared cache memory 512. The cache update request may include an updated data item. The updated data item may include the updated data item information.

At Step 954, the platform application may generate one or more additional data item keys for identifying different versions of the data item. For example, at step 952, the platform datastore component (the platform datastore component 220-1, 220-2, etc.) of the respective platform application (e.g., platform application 124-1, 124-2, etc.) may generate one or more additional data item keys for identifying different versions of the data item. Continuing with the example, the one or more additional data item keys may include a second version of a data item, when the platform application updated the first version of the data item at step 952. Additionally or alternatively, the one or more additional data item keys may include a first version of a data item, when the platform application updated the second version of the data item at step 952.

At Step 956, the platform application may isolate the version of the data item in the shared cache memory based at least partially on the one or more additional data item keys. For example, at step 956, the platform datastore component (the platform datastore component 220-1, 220-2, etc.) of the respective platform application (e.g., platform application 124-1, 124-2, etc.) may isolate the version of the data item (e.g., the first version of the data item, the second version of the data item, etc.) by removing one or more additional versions of the data item each having an associated additional data item key identified at step 954 from the shared cache memory 512.

It may be appreciated that by enabling the isolation of specific versions of data items cached in a shared cache memory in accordance with the example embodiments discussed above, hardware and/or software updates to the one or more applications, devices, and/or components may be performed in a rolling fashion, so that each of the multiple versions of the one or more applications, devices, and/or components may continue to operate and use the shared cache memory without interfering with other versions of those applications, devices, and/or components (e.g., newer versions interfering with older versions and/or older versions interfering with newer versions).

It may also be appreciated that by enabling the isolation of specific versions of data items cached in the shared cache memory, each of the one or more versions of the one or more applications, applications, devices, and/or components may also be decoupled from each other, so that none of the applications, devices, and/or components may be required to implement complex hardware and/or software modifications to enable compatibility between and among each other when accessing their respective data items cached in the shared cache memory. Additionally, even though one or more versions of the one or more applications, applications, devices, and/or components may be decoupled from each other, updates made to data item information that may be shared between multiple versions of a data item may also be propagated to other versions of the data item.

It may be further appreciated that by enabling the isolation of specific versions of data items cached in the shared cache memory, any new faults and/or errors introduced in an updated version of the applications, devices, and/or components with respect to accessing updated versions of data items cached in the shared memory (e.g., corruption of data item information in updated versions of data items cached in the shared memory, etc.), will not be able to adversely affect any other versions of the applications, devices, and/or components that may also be accessing their respective versions of data items cached in the shared memory. Additional technical advantages may be further realized by persons skilled in the art in light of the embodiments discussed herein.

Example Computer System

Various embodiments and components therein can be implemented, for example, using one or more well-known computer systems, such as, for example, platform server device(s) 120, client devices 110-$n$, display devices 112-$n$, and/or server devices 132-$n$ shown in FIG. 1. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Figure 10:
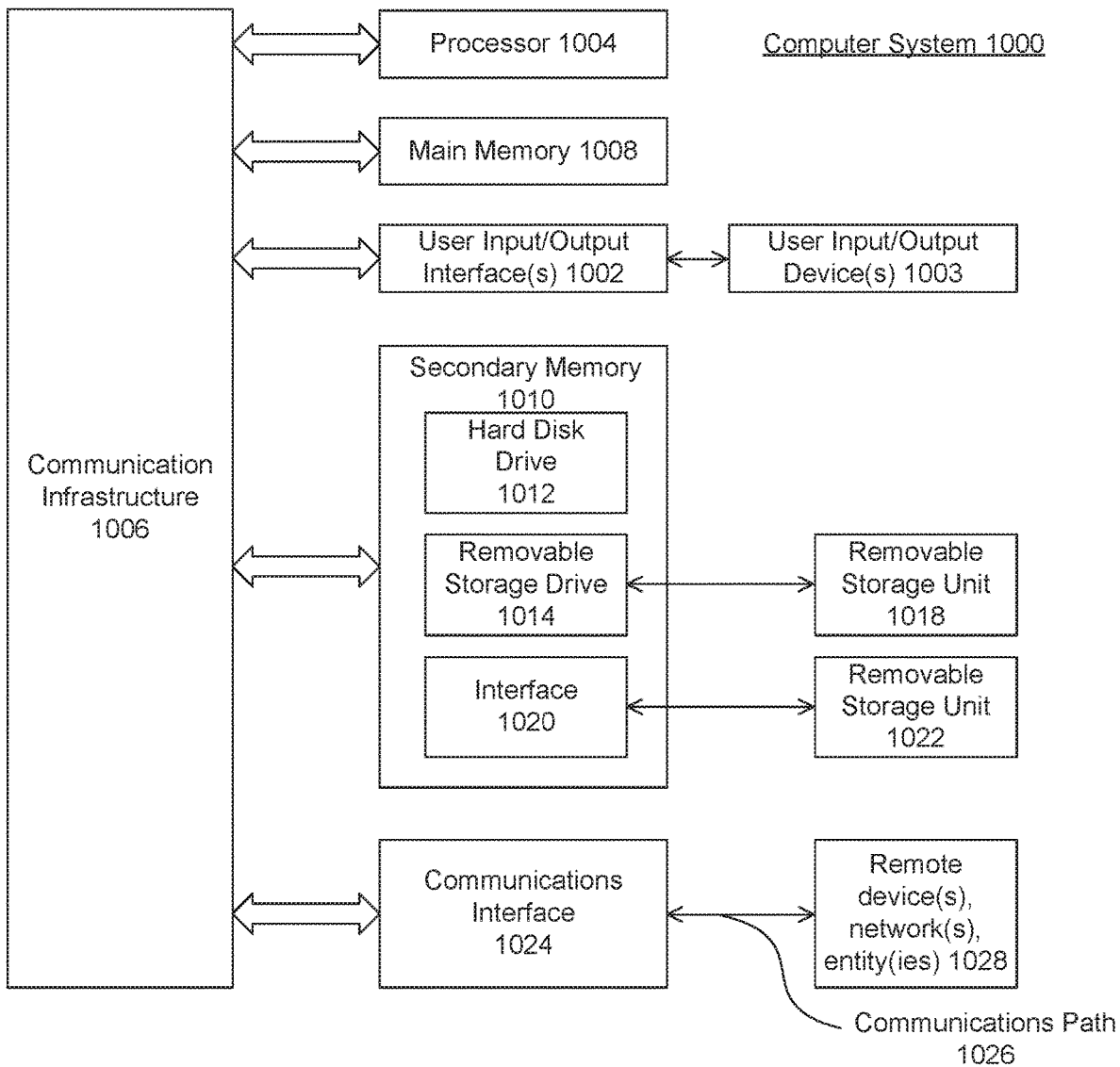
FIG. 10 illustrates an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 10. In particular, embodiments may operate with software, hardware, and/or operating system implementations other than those described herein.

Conclusion

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A system, comprising:
a platform datastore configured to store data item information; and
at least one processor configured to execute a shared cache application, wherein the shared cache application is operatively coupled to shared cache memory and is configured to:
receive a data item key corresponding to a request from a user profile operating on a media player;
receive a version identifier corresponding to a first version of an application operating on the media player;
determine that at least two versions of a data item both correspond to the data item key of the request and are stored as part of the user profile as managed by a shared cache, the at least two versions of the data item corresponding to two different versions of at least one of: hardware or firmware of the media player accessed by the user profile, including both a first version of the data item including a first value corresponding to the first version of the application operating on the media player and a second version of the data item including a second value corresponding to a second version of the application;
generate a key component comprising the first version of the application operating on the media player appended to a user profile identifier corresponding to the user profile;
provide both the generated key component and the data item key to the shared cache;
receive the first value of the data item as stored in the shared cache responsive to providing both the data item key and the generated key component to the shared cache;
receive a cache update request for the first value of the data item, the cache update request including the key component and a new value for the data item; and
update the first value of the first version of the data item responsive to the cache update request, wherein the second value of the second version of the data item is unchanged by the updating.

2. The system of claim 1, wherein
the first version of the data item is associated with a first data item key for identifying the first version of the data item cached in the shared cache memory, and
the second version of the data item is associated with a second data item key for identifying the second version of the data item cached in the shared cache memory.

3. The system of claim 1, wherein
the first version of the data item includes a first attribute-value pair identifying a first datastore property and the first value,
the second version of the data item includes a second attribute-value pair identifying a second datastore property and the second value, and
the first datastore property and the first value is substantially equivalent to the second datastore property and the second value.

4. The system of claim 1, further comprising:
a first version of a platform application configured to at least receive a request to access the data item information from a first version of a media device, wherein the request from the first version of the media device includes a version agnostic identifier; and
a second version of the platform application configured to at least receive a request to access the data item information from a second version of the media device, wherein the request from the second version of the media device includes the version agnostic identifier.

5. The system of claim 4, wherein
the first version of the platform application is further configured to at least transmit a first, cache write request to the shared cache application to request caching of the first version of the data item in the shared cache memory, in response to the request to access the data item information from the first version of a media device, and
the second version of the platform application is further configured to at least transmit a second cache write request to the shared cache application to request caching of the second version of the data item in the shared cache memory, in response to a request to access the data item information from the second version of the media device.

6. The system of claim 5, wherein
the first cache write request includes the first version of the data item and a first data item key generated based on combining the version agnostic identifier and a first version specific identifier associated with the first version of the data item, and
the second cache write request includes the second version of the data item and a second data item key generated based on combining the version agnostic identifier and a second version specific identifier associated with the second version of the data item.

7. The system of claim 6, wherein the shared cache application is further configured to:
receive an active versions request from the first version of the platform application to retrieve a collection of version specific identifiers, wherein the collection of version specific identifiers includes the second version specific identifier and excludes the first version specific identifier.

8. A computer implemented method, comprising:
receiving a data item key corresponding to a request from a user profile operating on a media player;
receiving a version identifier corresponding to a first version of an application operating on the media player;
determining that at least two versions of a data item both correspond to the data item key of the request and are stored as part of the user profile as managed by a shared cache, the at least two versions of the data item corresponding to two different versions of at least one of: hardware or firmware of the media player accessed by the user profile, including both a first version of the data item including a first value corresponding to the first version of the application operating on the media player and a second version of the data item including a second value corresponding to a second version of the application;
generating a key component comprising the first version of the application operating on the media player appended to a user profile identifier corresponding to the user profile;
providing both the generated key component and the data item key to the shared cache;
receiving the first value of the data item as stored in the shared cache responsive to providing both the data item key and the generated key component to the shared cache;
receiving a cache update request for the first value of the data item, the cache update request including the key component and a new value for the data item; and
updating the first value of the first version of the data item responsive to the cache update request, wherein the second value of the second version of the data item is unchanged by the updating.

9. The computer implemented method of claim 8, wherein
the first version of the data item is associated with a first data item key for identifying the first version of the data item cached in the shared cache memory, and
the second version of the data item is associated with a second data item key for identifying the second version of the data item cached in the shared cache memory.

10. The computer implemented method of claim 8, wherein
the first version of the data item includes a first attribute-value pair identifying a first datastore property and the first value,
the second version of the data item includes a second attribute-value pair identifying a second datastore property and the second value, and
the first datastore property and the first value is substantially equivalent to the second datastore property and the second value.

11. The computer implemented method of claim 8, further comprising:
receiving a first cache write request from a first version of a platform application to request caching of the first version of the data item in the shared cache memory, and
receiving a second cache write request from a second version of the platform application to request caching of the second version of the data item in the shared cache memory.

12. The computer implemented method of claim 11, wherein
the first cache write request includes the first version of the data item and a first data item key generated based on combining a version agnostic identifier and a first version specific identifier associated with the first version of the data item, and
the second cache write request includes the second version of the data item and a second data item key generated based on combining the version agnostic identifier and a second version specific identifier associated with the second version of the data item.

13. The computer implemented method of claim 12, further comprising:
receiving an active versions request from the first version of the platform application to retrieve a collection of version specific identifiers, wherein the collection of version specific identifiers includes the second version specific identifier and excludes the first version specific identifier and
transmitting an active versions response to the first version of the platform application in response to the active versions request, wherein the active versions response includes the collection of version specific identifiers.

14. The computer implemented method of claim 8, wherein the first version of the platform is associated with a first device, and the second version of the platform is associated with a second device, different from the first device.

15. The computer implemented method of claim 8, wherein the version identifier identifying the first version of the data item comprises a version specific identifier received from the media player.

16. The computer implemented method of claim 15, wherein the version specific identifier differentiates the first version of the data item stored as part of the user profile from the second version of the data item stored as part of the user profile.

17. The computer implemented method of claim 8, wherein the updating comprises:
transmitting a datastore update request including the new value for the data item to a datastore.

18. A non-transitory computer-readable medium having instructions stored thereon that, when executed by at least one computing device, cause the at least one computing device to perform operations comprising:

receiving a data item key corresponding to a request from a user profile operating on a media player;

receiving a version identifier corresponding to a first version of an application operating on the media player;

determining that at least two versions of a data item both correspond to the data item key of the request and are stored as part of the user profile as managed by a shared cache, the at least two versions of the data item corresponding to two different versions of at least one of: hardware or firmware of the media player accessed by the user profile, including both a first version of the data item including a first value corresponding to the first version of the application operating on the media player and a second version of the data item including a second value corresponding to a second version of the application;

generating a key component comprising the first version of the application operating on the media player appended to a user profile identifier corresponding to the user profile;

providing both the generated key component and the data item key to the shared cache;

receiving the first value of the data item as stored in the shared cache responsive to providing both the data item key and the generated key component to the shared cache;

receiving a cache update request for the first value of the data item, the cache update request including the key component and a new value for the data item; and updating the first value of the first version of the data item responsive to the cache update request, wherein the second value of the second version of the data item is unchanged by the updating.

19. The non-transitory computer-readable medium of claim 18, wherein the first version of the data item includes a first attribute-value pair identifying a first datastore property and the first value, the second version of the data item includes a second attribute-value pair identifying a second datastore property and the second value, and the first datastore property and the first value is substantially equivalent to the second datastore property and the second value.

20. The non-transitory computer-readable medium of claim 18, the operations further comprising:

receiving a first cache write request from a first version of a platform application to request caching of the first version of the data item in the shared cache memory, and receiving a second cache write request from a second version of the platform application to request caching of the second version of the data item in the shared cache memory.

21. The non-transitory computer-readable medium of claim 20, wherein the first cache write request includes the first version of the data item and a first data item key generated based on combining a version agnostic identifier and a first version specific identifier associated with the first, version of the data item, and the second cache write request includes the second version of the data item and a second data item key generated based on combining the version agnostic identifier and a second version specific identifier associated with the second version of the data item.

22. The non-transitory computer-readable medium of claim 21, the operations further comprising:

receiving an active versions request from the first version of the platform application to retrieve a collection of version specific identifiers, wherein the collection of version specific identifiers includes the second version specific identifier and excludes the first version specific identifier; and transmitting an active versions response to the first version of the platform application in response to the active versions request, wherein the active versions response includes the collection of version specific identifiers.

* * * * *